(12) United States Patent
Thompson

(10) Patent No.: US 9,573,648 B2
(45) Date of Patent: Feb. 21, 2017

(54) WHEEL COUPLING

(71) Applicant: Ford Global Technologies, LLC, Dearborn, MI (US)

(72) Inventor: Thomas Robert George Thompson, Brentwood (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 22 days.

(21) Appl. No.: 14/332,990

(22) Filed: Jul. 16, 2014

(65) Prior Publication Data

US 2016/0016634 A1   Jan. 21, 2016

(51) Int. Cl.
| | |
|---|---|
| *B62K 25/02* | (2006.01) |
| *B62K 15/00* | (2006.01) |
| *B62M 6/65* | (2010.01) |

(52) U.S. Cl.
CPC ............. *B62K 25/02* (2013.01); *B62K 15/008* (2013.01); *B62M 6/65* (2013.01); *B62K 2015/003* (2013.01); *B62K 2206/00* (2013.01)

(58) Field of Classification Search
CPC . B62K 25/02; B62K 15/008; B62K 2015/003; B62K 2206/00; B62M 6/65; B60B 27/023; B60B 27/04; B60B 27/047; Y10T 403/7039; Y10T 403/7094
See application file for complete search history.

(56) References Cited

U.S. PATENT DOCUMENTS

| | | |
|---|---|---|
| 2,359,764 A | 10/1944 | Johnson |
| 3,422,701 A | 1/1969 | Boisis |
| 3,722,913 A | 3/1973 | Housayama |
| 4,202,561 A | 5/1980 | Yonkers |
| 4,440,414 A | 4/1984 | Wang |
| 4,964,287 A * | 10/1990 | Gaul ...................... B62H 5/001 224/924 |

(Continued)

FOREIGN PATENT DOCUMENTS

| | | |
|---|---|---|
| CN | 2754996 Y | 2/2006 |
| CN | 2808712 Y | 8/2006 |

(Continued)

OTHER PUBLICATIONS

Fox Bike Technology, "15QR", Dec. 12, 2010 (10 pages).

(Continued)

*Primary Examiner* — Hau Phan
*Assistant Examiner* — Jacob Meyer
(74) *Attorney, Agent, or Firm* — Frank A. MacKenzie; Bejin Bieneman PLC

(57) ABSTRACT

An apparatus includes a first component having with a first coupling surface and a first axial aperture therethrough. The first component has an axial recess in the first coupling surface. The apparatus further includes a second component having a second coupling surface and a second axial aperture therethrough, and the second component has an axial protrusion extending from the second coupling surface. The axial recess of the first component and the axial protrusion of the second component selectively engage to radially lock the first component relative to the second component and align the first and second apertures upon engagement with each other. The first and second apertures selectively receive a bicycle wheel axle.

18 Claims, 22 Drawing Sheets

(56) References Cited

U.S. PATENT DOCUMENTS

| | | | |
|---|---|---|---|
| 5,027,628 A * | 7/1991 | De Rocher | B62H 5/001 70/225 |
| 5,052,706 A | 10/1991 | Tsai et al. | |
| 5,165,762 A | 11/1992 | Phillips | |
| 5,301,778 A * | 4/1994 | Haeussinger | B60B 27/023 192/64 |
| 5,549,315 A * | 8/1996 | Ashman | B60B 27/023 280/279 |
| 5,772,227 A | 6/1998 | Michail | |
| 5,875,947 A * | 3/1999 | Noel | B60R 9/10 211/17 |
| 5,984,423 A * | 11/1999 | Becker | B60B 27/023 301/110.5 |
| 6,409,281 B1 * | 6/2002 | Kanehisa | B60B 27/047 301/110.5 |
| 6,435,622 B1 * | 8/2002 | Kanehisa | B60B 27/0005 301/110.5 |
| 6,446,745 B1 | 9/2002 | Lee et al. | |
| 6,523,659 B2 * | 2/2003 | Kanehisa | B60B 27/0005 192/64 |
| 6,637,292 B2 | 10/2003 | Chu | |
| 6,669,306 B1 * | 12/2003 | Hara | B60B 27/0078 280/288 |
| 6,979,013 B2 | 12/2005 | Chen | |
| 7,156,409 B2 | 1/2007 | Chuang | |
| 7,243,936 B2 | 7/2007 | Huang | |
| 7,341,268 B2 | 3/2008 | Lin | |
| 7,357,209 B2 * | 4/2008 | Kokatsu | A63B 22/0605 180/206.2 |
| 7,530,645 B2 | 5/2009 | Takachi | |
| 7,562,942 B2 * | 7/2009 | D'Aluisio | B60B 1/0223 280/279 |
| 7,706,935 B2 | 4/2010 | Dube et al. | |
| 7,708,297 B2 * | 5/2010 | Thorpe | B60B 3/14 280/261 |
| 7,731,214 B2 * | 6/2010 | Laird | B62K 25/02 280/276 |
| 7,896,381 B2 * | 3/2011 | Addink | B60B 27/0005 280/276 |
| 7,909,412 B2 * | 3/2011 | Ashman | B62K 25/02 301/110.5 |
| 8,020,883 B2 | 9/2011 | Brusca | |
| 8,123,243 B2 | 2/2012 | Ho | |
| 8,382,134 B2 * | 2/2013 | Bartlett | B62K 25/02 280/279 |
| 8,398,105 B2 * | 3/2013 | Becker | B62K 25/08 188/289 |
| 8,430,414 B1 | 4/2013 | Yap | |
| 8,473,130 B2 | 6/2013 | Brady et al. | |
| 8,527,113 B2 * | 9/2013 | Yamauchi | G05D 1/0038 701/2 |
| 8,540,322 B2 * | 9/2013 | Thorpe | B60B 3/14 301/110.5 |
| 8,602,149 B2 | 12/2013 | Krieger et al. | |
| 8,777,330 B2 * | 7/2014 | Lim | B62K 25/02 301/124.2 |
| D741,777 S * | 10/2015 | Henderson | D12/213 |
| D742,297 S * | 11/2015 | Henderson | D12/213 |
| 9,227,465 B2 * | 1/2016 | Nakajima | B62K 25/04 |
| 9,227,690 B1 * | 1/2016 | Becker | B62K 25/02 |
| 9,308,961 B2 * | 4/2016 | McDonald | B62K 25/02 |
| 2003/0094072 A1 | 5/2003 | Chen | |
| 2004/0046353 A1 | 3/2004 | Neugent | |
| 2005/0029033 A1 | 2/2005 | Rip et al. | |
| 2010/0025958 A1 | 2/2010 | Steenstra | |
| 2013/0249189 A1 | 9/2013 | Falzari | |
| 2013/0334871 A1 | 12/2013 | Chang | |
| 2014/0137830 A1 | 5/2014 | Satou et al. | |

FOREIGN PATENT DOCUMENTS

| | | |
|---|---|---|
| CN | 2820688 Y | 9/2006 |
| CN | 2825435 Y | 10/2006 |
| CN | 2883151 Y | 3/2007 |
| CN | 201037025 Y | 3/2008 |
| CN | 201158435 Y | 12/2008 |
| CN | 101519100 A | 9/2009 |
| CN | 102050190 A | 5/2011 |
| CN | 201842198 U | 5/2011 |
| CN | 103264741 A | 8/2013 |
| CN | 103523138 A | 1/2014 |
| DE | 10044252 | 4/2002 |
| DE | 10201102084 A1 | 3/2013 |
| EP | 1295785 A1 | 3/2003 |
| EP | 2176117 B1 | 3/2011 |
| EP | 2301834 A1 | 3/2011 |
| EP | 2489583 A1 | 8/2012 |
| EP | 2644492 A1 | 10/2013 |
| ES | 2097677 A1 | 4/1997 |
| GB | 572237 | 9/1945 |
| KR | 20120059767 A | 6/2012 |
| TW | 201141749 | 12/2011 |
| WO | 02100711 A1 | 12/2002 |
| WO | 2004087492 A1 | 10/2004 |
| WO | 2010127456 A1 | 11/2010 |
| WO | 2013124764 A1 | 8/2013 |

OTHER PUBLICATIONS

DesignBuzz.com, "Antares Lift: Cary your bike inside your place", http://www.designbuzz.com/antares-lift-carry-you-bike-inside/ (3 pages).

Wordlesstech.com, "Armadillo concept folding bike", wordlesstech.com/2011/03/21/armadillo-concept-folding-bike/, Feb. 27, 2014 (7 pages).

folding-bikes.com, "iF Mode", Pacific Cycles, http://www.folding-bikes.com/bikes/ifmode (2 pages).

Automotive Anti-Vibration Activity, http://www.paulstra-auto.com/paulstra-auto.html (1 page).

Bromfoot: A Better Folding Pedal, http://www.bromfoot.com, Feb. 26, 2014 (5 pages).

Weiss, "Fitness shirt powers e-bike based on heart rate and breathing", Fraunhofer Institute 2013 (6 pages).

Wallack, "Folding bicycles travel well", Los Angeles Times, Mar. 9, 2009, articles.latimes.com/2009/mar/09/health/he-gear9, (3 pages).

Montague Bikes, "Folding Your Bicycle", www.montaguebikes.com/folding-your-montague-folding-bike.html (2 pages).

Rock Shox: Installation Specifications, Rear Maxle Lite, www.sram.com, 2011 (4 pages).

The fold: Brompton Bicycle, http://brompton.com/pages/9035, 2014 (2 pages).

* cited by examiner

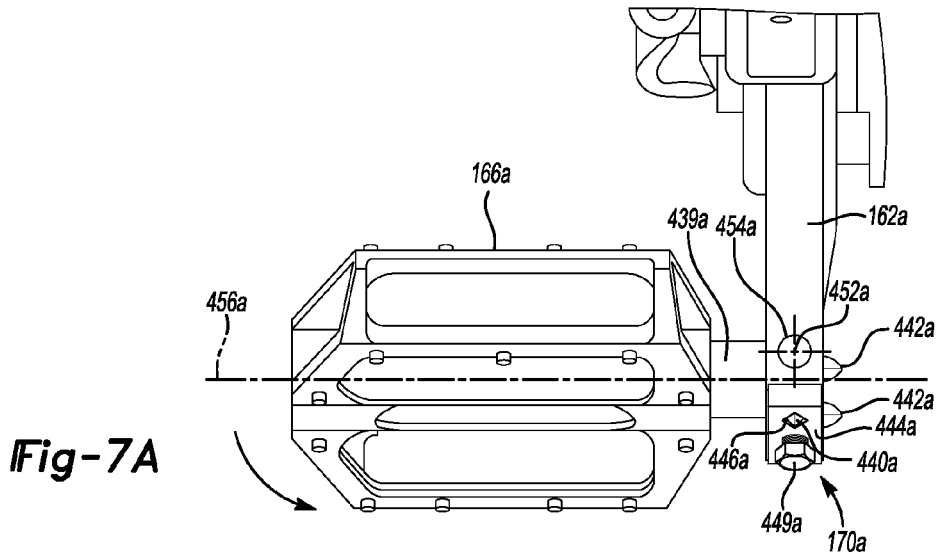
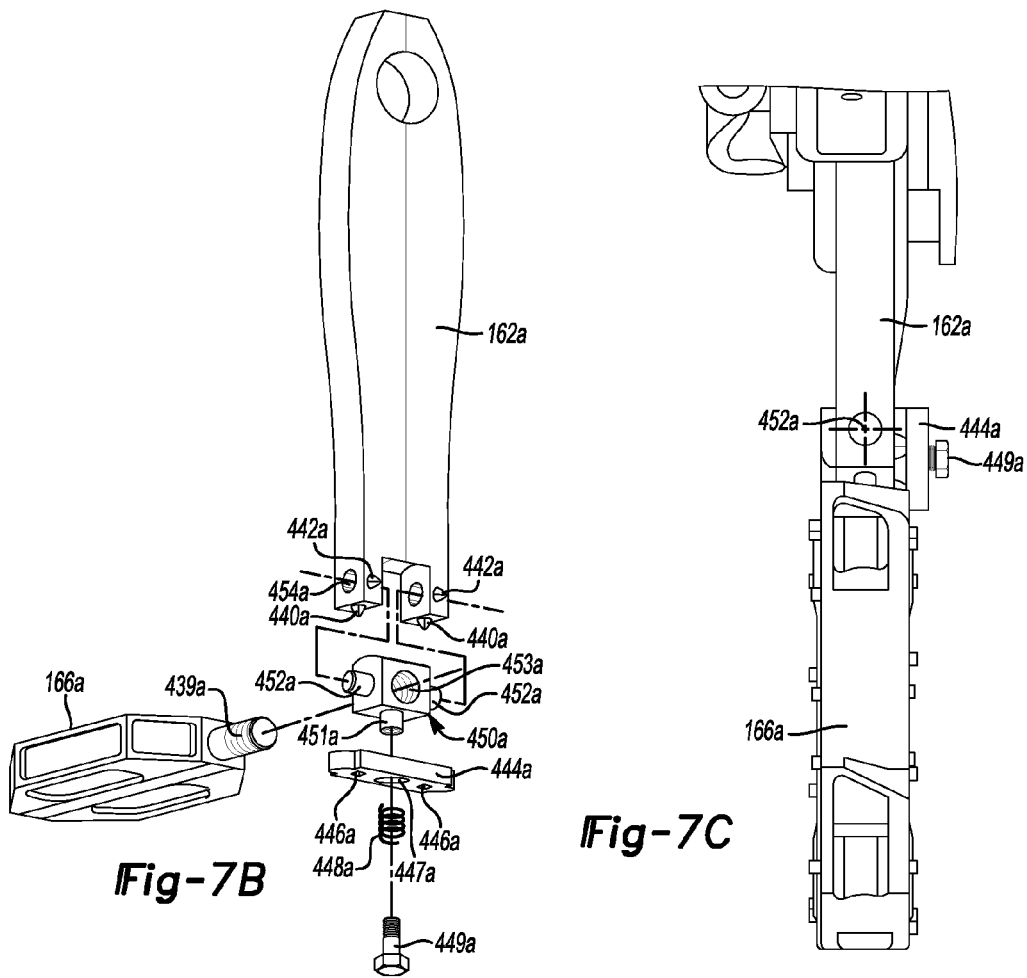

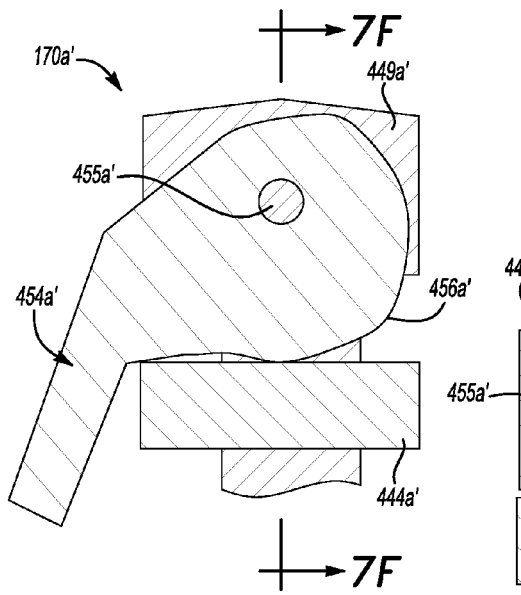
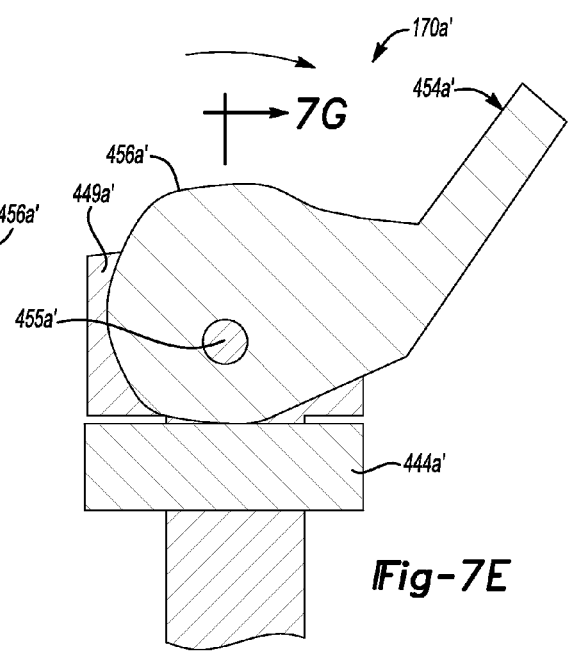
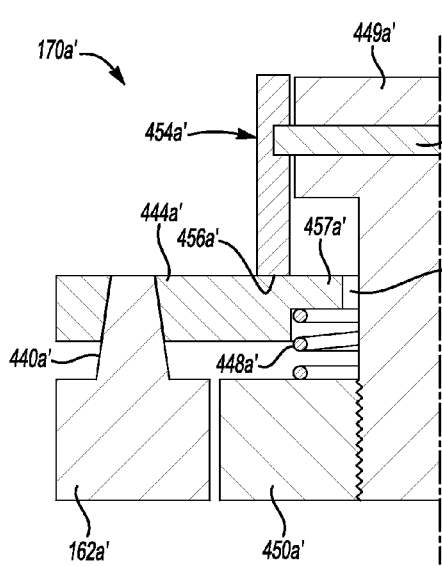
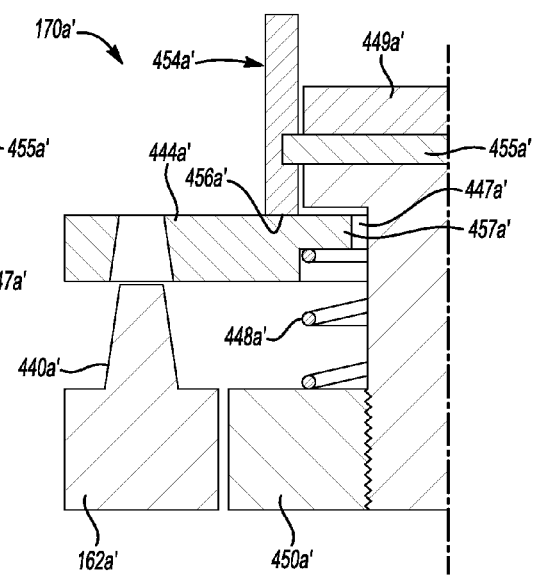
Fig-7D
Fig-7E
Fig-7F
Fig-7G

WHEEL COUPLING

CROSS REFERENCE TO RELATED APPLICATIONS

This application is related to the following applications, the contents of each of which are hereby incorporated by reference in their entirety: U.S. Ser. No. 14/332,960, filed on Jul. 16, 2014, titled "FOLDING PEDAL MOUNT"; U.S. Ser. No. 14/332,965, filed on Jul. 16, 2014, titled "BICYCLE CONTROL SYSTEM"; U.S. Ser. No. 14/332,978, filed on Jul. 16, 2014, titled "TOWABLE BICYCLE"; U.S. Ser. No. 14/332,983, filed on Jul. 16, 2014, titled "FOLDING BICYCLE"; U.S. Ser. No. 14/332,998, filed on Jul. 16, 2014, titled "FOLDING HANDLEBAR MOUNT"; U.S. Ser. No. 14/333,010, filed on Jul. 16, 2014, titled "BICYCLE FRAME JOINT LOCKING MECHANISM"; U.S. Ser. No. 14/333,020, filed on Jul. 16, 2014, titled "BICYCLE WHEEL AXLE"; U.S. Ser. No. 14/333,093, filed on Jul. 16, 2014, titled "FOLDING BICYCLE CHAIN STAY AND FRAME"; and U.S. Ser. No. 14/333,107, filed on Jul. 16, 2014, titled "BICYCLE CHAIN STAY COUPLING".

BACKGROUND

As standard bicycles do not fit conveniently into the provided luggage space of passenger cars, and may be difficult to navigate through public areas such as trains, buses, stations, and airports, folding bicycles may be desirable. However, a typical folding bicycle is designed to be carried when not in use and has many specially-designed components—e.g. pedals, handlebars, drive systems and seating—which cannot be interchanged with standard bicycle industry components. Such specially-designed components may not be desirable, as cyclists and/or retailer may prefer to equip a bicycle with different types of pedals, seats, handlebars, etc. according to their own preferences or target markets. For example, the variety of pedals include clipless pedals, caged pedals, platform pedals and toe-clipped pedals.

Furthermore, while many bicycles feature quick-release wheels, typical quick-release rear wheels retain the drive sprockets or gear cassette on the wheel hub, maintaining a jagged and oily surface on one side of the wheel. Additionally, with a typical quick-release wheel, such as on a single speed bicycles without a derailleur or chain tensioning device, the user may need to manipulate the bicycle chain to remove it from the sprockets.

An electric bicycle provides mechanical power in assistance to that provided by the rider through the pedals. While the performance of the electrical bicycle across a range of load conditions (e.g., changes in incline of the bicycle path) may be an important characteristic of the bicycle, it is highly dependent on the physiology of the user. However, in a typical electric bicycle, physiological factors for the user such as pedal power, pedal force, preferred pedaling cadence, weight load on the bicycle (e.g. the user and luggage), comfort level (e.g. measured or calculated physical exertion), riding skill, aerodynamic form, clothing and physical fitness amongst others are all unknown and variable. Additionally, typical electric bicycles are heavier than standard bicycles because of the additional weight of the motor and battery pack and, therefore, may be relatively difficult to manipulate in situations and locations where the bicycle may not be ridden, such as pedestrian areas and public transportation stations or vehicles.

DRAWINGS

FIG. 7A is a perspective view of an exemplary pedal and crank arm assembly in an operating position.

FIG. 7B is an exploded perspective view of the pedal and crank arm assembly of FIG. 7A.

FIG. 7C is a side view of the pedal and crank arm assembly of FIG. 7A in a folded position.

FIG. 7D is a partial side view of a lever and bracket for another exemplary pedal and crank arm assembly in a locked arrangement.

FIG. 7E is a partial side view of the lever and bracket for the pedal and crank arm assembly of FIG. 7D in an unlocked arrangement.

FIG. 7F is a partial cross-sectional view of the pedal and crank arm assembly of FIG. 7D along the line 7F in FIG. 7D.

FIG. 7G is a partial cross-sectional view of the pedal and crank arm assembly of FIG. 7E along the line 7G in FIG. 7E.

DETAILED DESCRIPTION

Overview

An exemplary bicycle according to the present disclosure includes a folding frame from which the wheels may be removed or re-positioned for reconfiguration and/or for storage of the frame. The folded frame fits inside a typical passenger car's luggage space, minimizing the loss of luggage space capacity and, if the wheels are removed, the weight for lifting. An exemplary bicycle may include a power and control system, including a computer and data input devices for measuring, e.g., physiological factors of the user and controlling the motor according to the user characteristics. An exemplary bicycle may be configured in a towing configuration, with the wheels reattached and/or re-positioned to the folded frame, to enable the bicycle, and any attachment thereto (e.g. luggage), to be pulled by a user. In implementations including a power and control system, the motor may be activated in the towing configuration to assist in the towing of the folded bicycle. An exemplary bicycle may also include folding pedal and handlebar mounts, a folding chain stay component, two or more pivots of the frame coupled together at a single locking lever, and the wheel couplings and wheel axles disclosed herein. An exemplary bicycle may also be compatible with standard cycle industry components, such as pedals, brake levers, gear shifters, hand grips, front fork assemblies, wheels, headset bearings, free hubs, chainsets, and gear cassettes.

Exemplary Bicycle Elements

Figure 1:
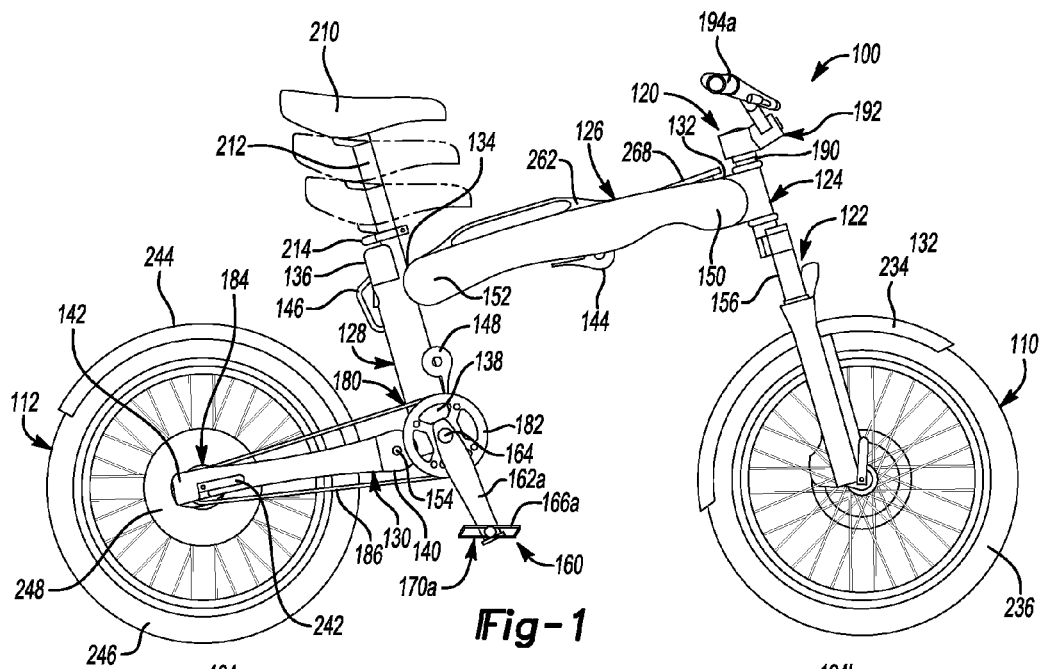
FIG. 1 is a side view of an exemplary bicycle.

FIG. 1 is a side view of an exemplary bicycle 100. It should be understood that, unless otherwise stated herein, the disclosure of all components of bicycles according to the principles of the present disclosure may be applicable to each exemplary bicycle or bicycle sub-system, sub-assembly, portion, section, or mechanism, respectively.

The bicycle 100 includes a front wheel 110 and a rear wheel 112. The front and rear wheels 110, 112 are rotatably coupled to a frame assembly 120, also referred to herein as the frame.

The frame assembly 120 and the front wheel 110 selectively engage at a front fork tube 122. The front fork tube 122 is coupled to a head tube 124. The frame assembly 120 further includes a top tube 126 coupled to the head tube 124, a seat tube 128 is coupled to a the top tube 126 opposite the head tube 124, and a chain stay 130 coupled to the seat tube 128. The head tube 124 is coupled to the top tube 126 proximate a forward end 132 of the top tube 126, and, proximate an opposing rearward end 134 of the top tube 126, an upper end 136 of the seat tube 128 is coupled to the top tube 126. At a lower end 138 of the seat tube 128, a pedal end 140 of the chain stay 130 is coupled thereto. The rear wheel 112 is coupled to an opposing wheel end 142 of the chain stay 130. The components of the frame assembly 120 may include materials such as, for example, fiber-based polymer composites, steel, titanium and aluminum alloys.

Figure 4:
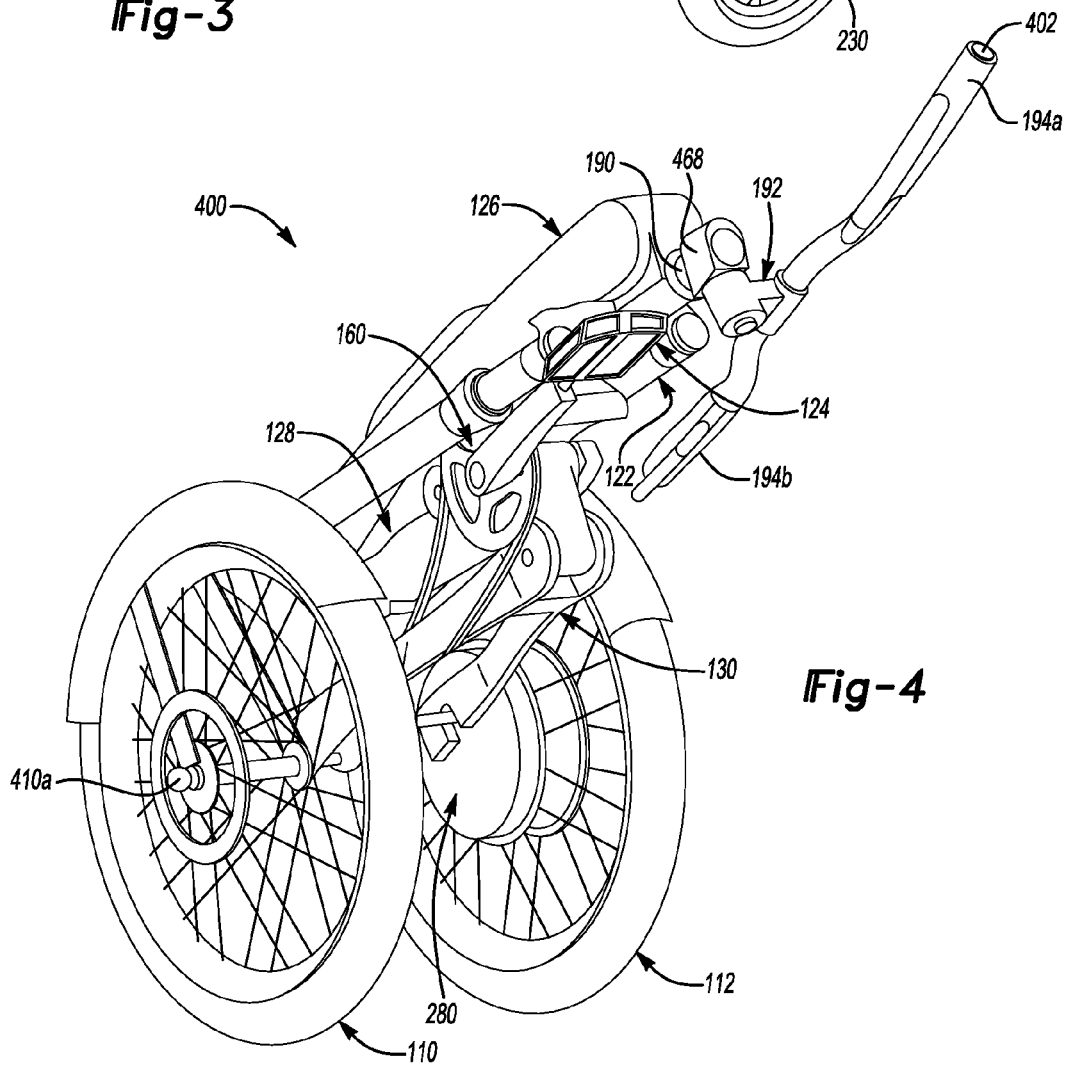
FIG. 4 is a perspective view of an exemplary towing configuration for a bicycle according to the principles of the present disclosure.
Figure 28:
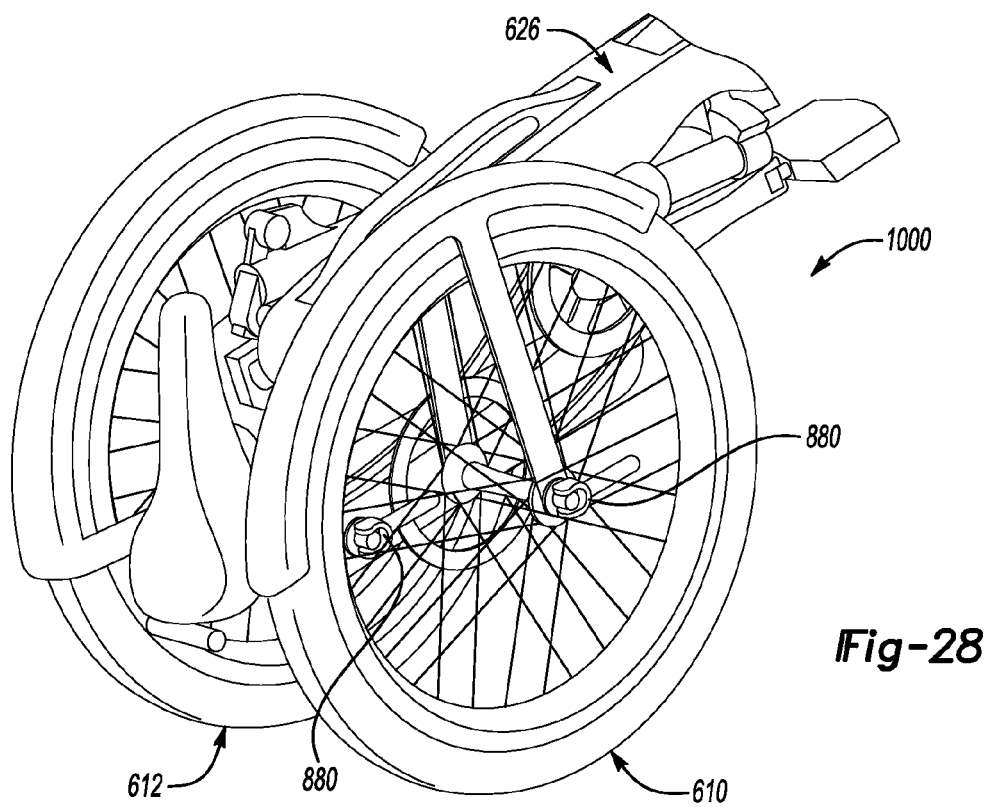
FIG. 28 is a partial perspective view of another exemplary towing configuration for a bicycle according to the principles of the present disclosure.

In one implementation, the frame assembly 120 of the bicycle 100 includes a first frame lever 144 coupled to the top tube 126 and second and third frame levers 146, 148 coupled to the seat tube 128. The first frame lever 144 selectively locks the head tube 124 relative to the top tube 126 about a first frame pivot 150; the second frame lever 146 selectively locks the seat tube 128 relative to the top tube 126 about a second frame pivot 152, and the third frame lever 148 selectively locks the chain stay 130 relative to the seat tube 128 around a third frame pivot 154. The pivots 150, 152, 154 may be oriented substantially parallel to one another. In another example, according to the principles of the present disclosure, the frame 120 may be locked such as is described herein with respect to the frame 620 of the bicycle 600 and FIGS. 15-20. Accordingly, a bicycle according to the principles of the present disclosure and/or components thereof may be selectively configured for, e.g., upright operation (FIG. 1, FIG. 15), storage (FIG. 2D, FIG. 29) and towing (FIG. 4, FIG. 28).

The bicycle 100 may also include a suspension component 156 coupled between the front fork tube 122 and the front wheel 110. The suspension component 156 may be a hydraulic suspension mechanism. Additionally, the bicycle 100 includes brake mechanisms (not shown) operably coupled to each of the front and rear wheels 110, 112. The brake mechanisms may be, for example, hydraulic disc brake mechanisms or rim brake mechanisms.

Figure 2A:
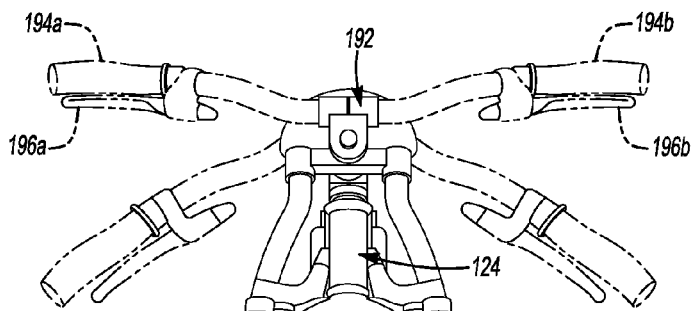
FIG. 2A is a front view of the exemplary bicycle of FIG. 1 with the pedals and handlebars in exemplary folded positions.
Figure 2A:
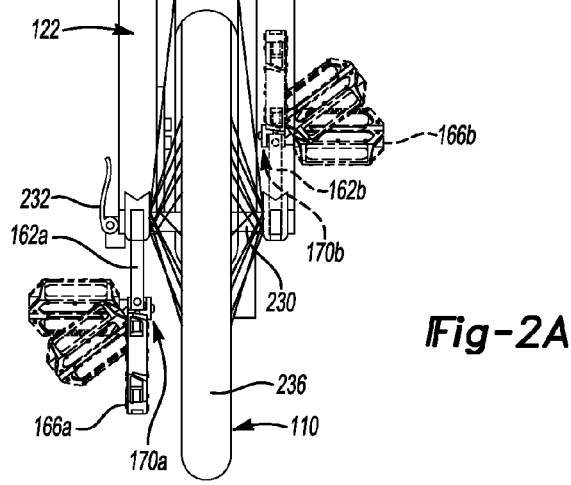

With reference to FIG. 2A in addition to FIG. 1, the bicycle 110 includes a pedal assembly or chainset 160 coupled to the seat tube 128 proximate the lower end 138 thereof. The chainset 160 includes a pair of crank arms 162a, 162b coupled to opposing ends of a pedal or bottom bracket axle 164. Pedals 166a, 166b are coupled to the ends of the crank arms 162a, 162b, respectively, opposite the bottom bracket axle 164. The pedals 166a, 166b engage with pedal mount mechanisms 170a, 170b, respectively. As described in herein with respect to FIGS. 7A-7G, the pedal mount mechanisms 170a, 170b are selectively operable to pivot the pedals 166a, 166b respectively between operating positions substantially orthogonal to the respective crank arms 162a, 162 (FIG. 1) and folded positions aligned with the respective crank arms 162a, 162b (FIGS. 2A-2D), in furtherance of selectively configuring the bicycle 100 for, e.g., upright operation (FIG. 1), storage (FIG. 2D) and towing (FIG. 4).

With continued reference to FIG. 1, the bicycle 100 includes a gear assembly 180 coupled between the chainset 160 and the rear wheel 112. The gear assembly 180 includes a front gear 182 fixed to the bottom bracket axle 164, a rear gear cassette 184 coupled to the rear wheel 112, and a chain 186 extending between the front gear 182 and the rear gear cassette 184. With bicycle 100 configured for upright operation (FIG. 1), the crank arms 162a, 162b and the bottom bracket axle 164 translate force applied to rotate the pedals 166a, 166b to drive the front gear 182, which, in turn, drives the rear wheel 112 through the chain 186 and the rear gear cassette 184. In other implementations, a bicycle according to the principles of the present disclosure may include a derailleur gear mechanism with components coupled to the chain stay and/or seat tube to provide for multiple gearing.

The bicycle 100 includes a stem 190 extending relatively upwards from head tube 124 opposite the front fork tube 122, with the bicycle 100 in the exemplary upright configuration illustrated in FIG. 1. The stem 190 supports a handlebar folding mechanism 192 and handlebars 194a, 194b coupled on opposite sides of the handlebar folding mechanism 192. As described in herein with respect to FIGS. 8A-8C and 9A-9B, the handlebar folding mechanism 192 is selectively operable to rotate the handlebars 194a, 194b between operating positions substantially orthogonal to the stem 190 and the head tube 124 (e.g. FIG. 1) and folded positions aligned with the stem 190 and the head tube 124 (e.g. FIGS. 2A-2D), in furtherance of selectively configuring the bicycle 100 for, e.g., upright operation (FIG. 1), storage (FIG. 2D) and towing (FIG. 4). The bicycle 100 may include handlebar components such as brake handles 196a, 196b respectively coupled to handlebars 194a, 194b.

With continued reference to FIG. 1, the bicycle 100 includes a seat 210 supported by a seat post 212 telescopically received within the seat tube 128. The bicycle 100 further includes a seat post locking mechanism 214, such as a selectively operable clamp or pin. Accordingly, the seat 210 may be adjusted relative to the frame assembly 120 and the chainset 160 for the comfort and size of a user of the bicycle 100. Furthermore, the seat 210 may be located proximate the upper end 136 of the seat tube 128 in furtherance of selectively configuring the bicycle 100 for, e.g., storage (FIG. 2D) and towing (FIG. 4).

Figure 11:
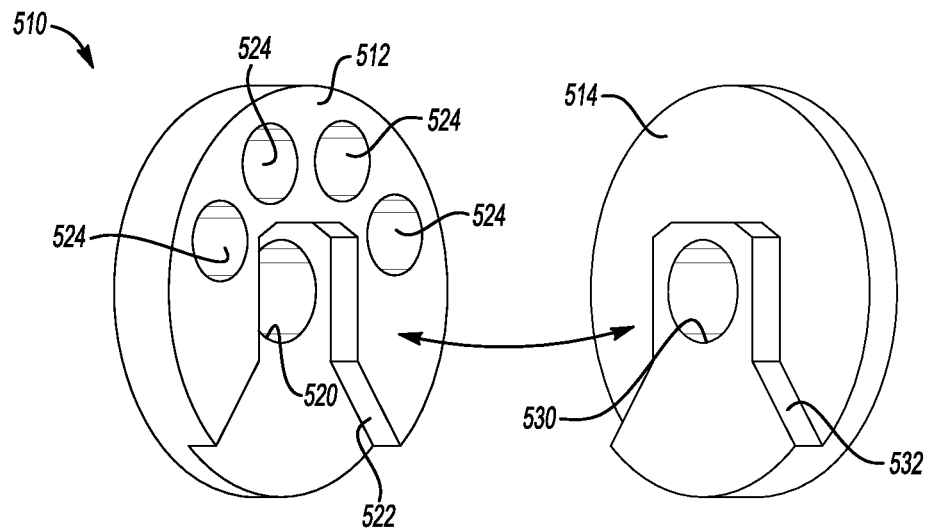
FIG. 11 is a perspective view of an exemplary wheel coupling for a bicycle according to the principles of the present disclosure.

The front wheel 110 engages the front fork tube 122 with a front axle 230 and one of the couplings 510 (e.g. FIG. 11). The front axle 230 includes a release handle 232 thereon, and the release handle 232 may be operated to temporarily remove the front axle 230 to allow removal of the front wheel 110 from the front fork tube 122 in furtherance of selectively configuring the bicycle 100 for, e.g., storage (FIG. 2D) and towing (FIG. 4). The front wheel 110 further includes a mudguard 234 and a tire 236.

The rear wheel 112 engages the chain stay 130 with a rear axle 240 (FIG. 6) and one of the couplings 510 (e.g. FIG. 11). The rear axle 240 includes a release handle 242 thereon, and the release handle 242 may be operated to temporarily remove the rear axle 240 to allow removal of the rear wheel 112 from the chain stay 130 in furtherance of selectively configuring the bicycle 100 for, e.g., storage (FIG. 2D) and towing (FIG. 4). The rear wheel 112 further includes a mudguard 244 and a tire 246.

Exemplary Folding of the Frame

FIG. 2A is a front view of the bicycle 100. To collapse the bicycle 100 from the upright configuration of FIG. 1 to the storage configuration of FIG. 2D, the pedals 166a, 166b are pivoted from operating positions substantially orthogonal to the respective crank arms 162a, 162b to folded positions aligned with the respective crank arms 162a, 162b, through operation of the pedal mount mechanisms 170a, 170b, respectively. The components and operation of the pedal mount mechanisms 170a, 170b are described in further detail herein with respect to FIGS. 7A-7G. Likewise, the handlebars 194a, 194b are pivoted from operating positions substantially orthogonal to the stem 190 and the head tube 124 to folded positions aligned with the stem 190 and the head tube 124, through operation of the handlebar folding mechanism 192. The components and operation of the handlebar folding mechanism 192 are described in further detail herein with respect to FIGS. 8A-8C and 9A-9B.

Figure 2B:
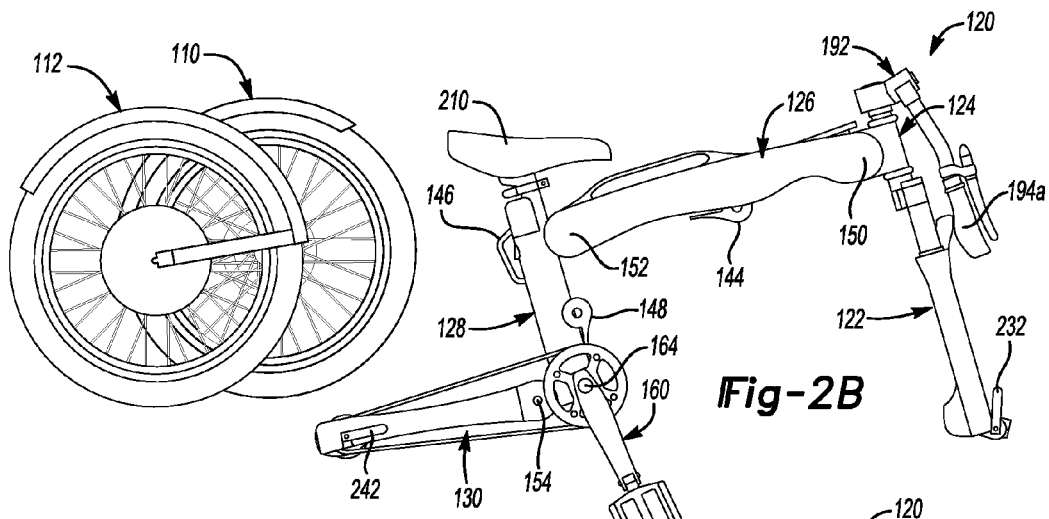
FIG. 2B is a side view of the bicycle of FIG. 2A with the seat in a collapsed position and the wheels removed from the frame.

FIG. 2B is a side view of the frame assembly 120 of the bicycle 100 with the front and rear wheels 110, 112 removed. In particular, the release handles 232, 242 have been operated to temporarily remove the front and rear axles 230, 240, and the front and rear wheels 110, 112 have been decoupled from the front fork tube 122 and the chain stay 130, respectively. The front and rear wheels 110, 112 may be separately stored from the frame assembly 120. The front and rear axles 230, 240 may be reattached to the frame assembly 120 for storage thereon.

Figure 2C:
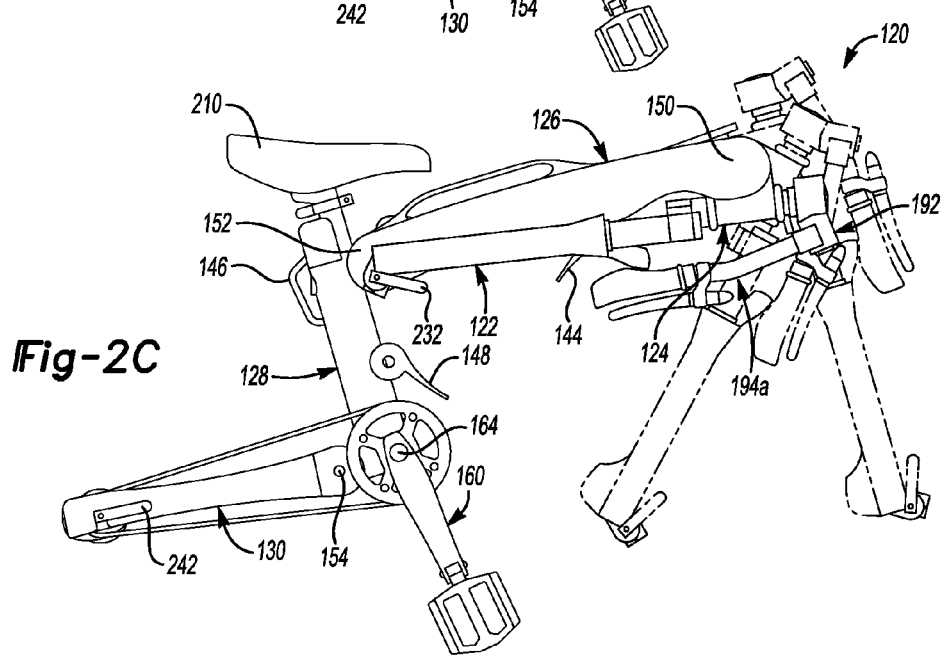
FIG. 2C is a side view of the bicycle frame of FIG. 2B with the head tube and associated components in an exemplary folded position.

FIG. 2C is a side view of the frame assembly 120 of the bicycle 100 with the head tube 126 in an exemplary folded or storage position. To fold the head tube 124 and the components coupled thereto—the front fork tube 122, the stem 190, the handlebar folding mechanism 192, and the handlebars 194a, 194b—relative to the top tube 126, the first frame lever 144 may be selectively operated to rotatably unlock the head tube 124 relative to the top tube 126, and the head tube 124 may be rotated about first frame pivot 150 such that the front fork tube 122 is overlapping the top tube 126.

Figure 2D:
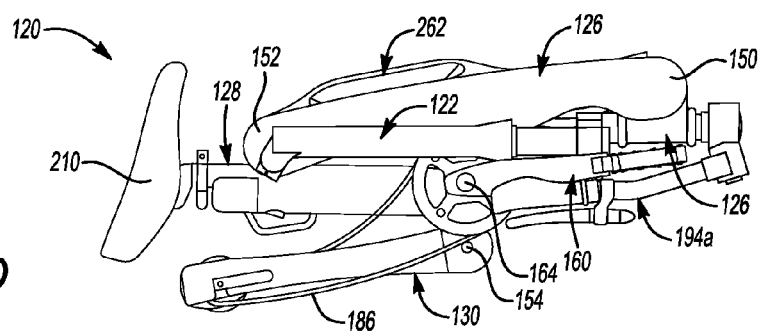
FIG. 2D is a side view of the bicycle frame of FIG. 2C with the seat tube and chain stay in exemplary folded positions.

FIG. 2D is a side view of the frame assembly 120 of the bicycle 100 in a configuration for storage, with the seat tube 124 and the chain stay 130 also in exemplary folded or storage positions. In this exemplary implementation, to fold the seat tube 128 and the components coupled thereto relative to the top tube 126, the second frame lever 146 may be selectively operated to rotatably unlock the seat tube 128 relative to the top tube 126, and the seat tube 128 may be rotated about second frame pivot 152 such that seat tube is disposed the top tube 126 and the front fork tube 122. To fold the chain stay 130 and the components coupled thereto relative to the seat tube 128, the third frame lever 148 may be selectively operated to rotatably unlock the chain stay 130 relative to the seat tube 128, and the chain stay 130 may be rotated about third frame pivot 154 such that the chain stay 130 is disposed along the seat tube 128. The third frame pivot 154 is spaced apart from bottom bracket axle 164 such that, when the wheel end 142 of the chain stay 130 is rotated toward the upper end of the seat tube 128, the rear gear cassette 184 of the gear assembly 180 moves closer to the front gear 182. As such, the chain 186 becomes slackened (FIG. 2D) and does not inhibit the folding of the frame assembly 120. It should be understood that, to set up the bicycle 100 in an upright configuration (e.g. FIG. 1), these steps may be reversed. It should be also understood that this procedure may vary according to the particular components employed in the bicycle, e.g. the multiple frame pivot locking mechanism disclosed with respect to the bicycle 600 and FIGS. 15-20.

With the frame assembly 120 of the bicycle 100 in the folded or storage configuration of FIG. 2D, the frame assembly 120 may be stored in a variety of locations, e.g., the trunk space of a compact automobile or beneath a desk in an office. In some implementations, each of the mechanisms for collapsing the bicycle 100 from an upright, operating configuration to a folded storage configuration—e.g. the first, second and third frame levers 144, 146, 148; the pedal mount mechanisms 170a, 170b; the handlebar folding mechanism 192; the seat post locking mechanism 214; and the front and rear release handles 232, 242 for the front and rear axles 230, 240, respectively—may each be manually operated, e.g., without the use of any additional tools. Accordingly, the bicycle 100 may be relatively quickly collapsed or set up, e.g., by some users, in less than 60 seconds, providing a convenient option for transporting the bicycle 100 in, e.g., pedestrian areas, public transport, and/or passenger vehicles.

Figure 3:
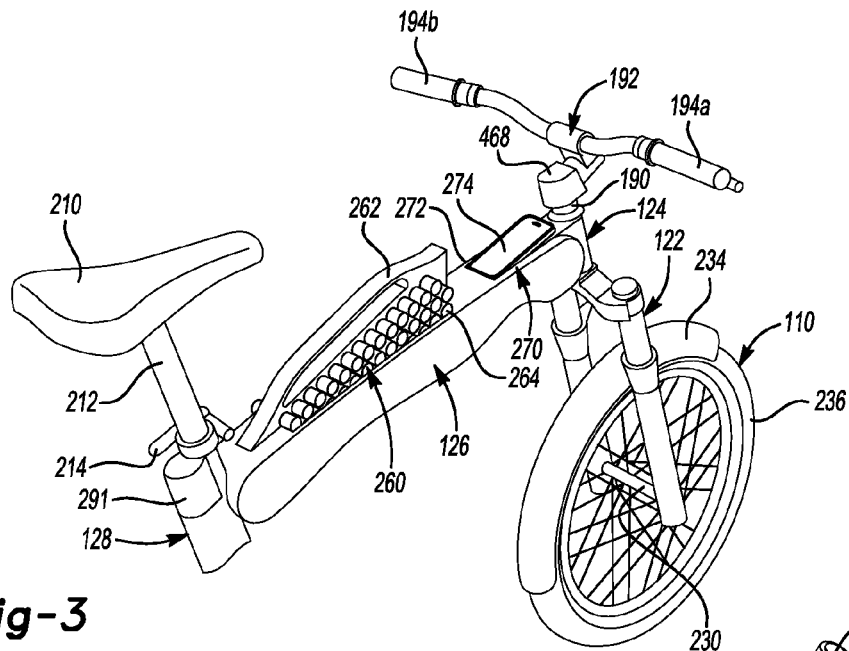
FIG. 3 is a partial perspective view of the bicycle of FIG. 1 with a power source partially disengaged from the top tube of the frame.

In some implementations, the bicycle 100 according to the present disclosure includes a power and control system 250 (FIG. 13), for selectively powering the movement, assisting the powering of the movement, and/or providing sensing and control of the bicycle 100. Referring to FIG. 3, the power and control system 250 for the bicycle 100 may include a power source 260, e.g. a rechargeable battery pack, supported within the top tube 126. In one example, the power source 260 may be a 36 volt, 8 amp-hour battery pack including an assembly of 40 2.2 amp-hour lithium-ion "AA" battery cells. The top tube 126 may include a support arm 262 for securing the power source 260 and providing access thereto to a user of the bicycle 100. The support arm 262 is complementary to a recess 264 in the top tube 126 to receive and secure the power source 260 and the support arm 262. The support arm 262 may be configured such that, in the folded configuration of the frame 120, the support arm 262 is at or near the center of gravity of the folded frame 120 and provides a carrying handle for the folded frame 120 (see, e.g., FIG. 2D).

The bicycle 100 may further include a control panel 270 to provide a user interface for the power and control system 250. As illustrated in FIG. 3, the exemplary control panel 270 may include a control mount 272 and a user device 274. The mount 272 and user device 274 coupled thereto are electrically coupled to the power source 260. It should be understood that the user device 274 may be any one of a variety of installed and/or removable computing devices including a processor and a memory, as well as communication capabilities. For example, the user device 274 may be a portable computer, tablet computer, a smart phone, etc. that includes capabilities for wireless communications using IEEE 802.11, Bluetooth, and/or cellular communications protocols. Further, the user device 274 may use such communication capabilities to communicate via a network, e.g., various wired and/or wireless networking technologies, e.g., cellular, Bluetooth, wired and/or wireless packet networks, etc. Accordingly, the user device 274 may be used to carry out operations such as voice recognition functions, cameras, global positioning system (GPS) functions, etc.

The power and control system 250 of the bicycle 100 may also include a motor 280 coupled to and supported by the rear wheel 112. For example, the motor 280 may be an electrically powered 250 or 350 watt brushless DC hub motor. The motor 280 is electrically coupled to the power source 260.

Figure 13:
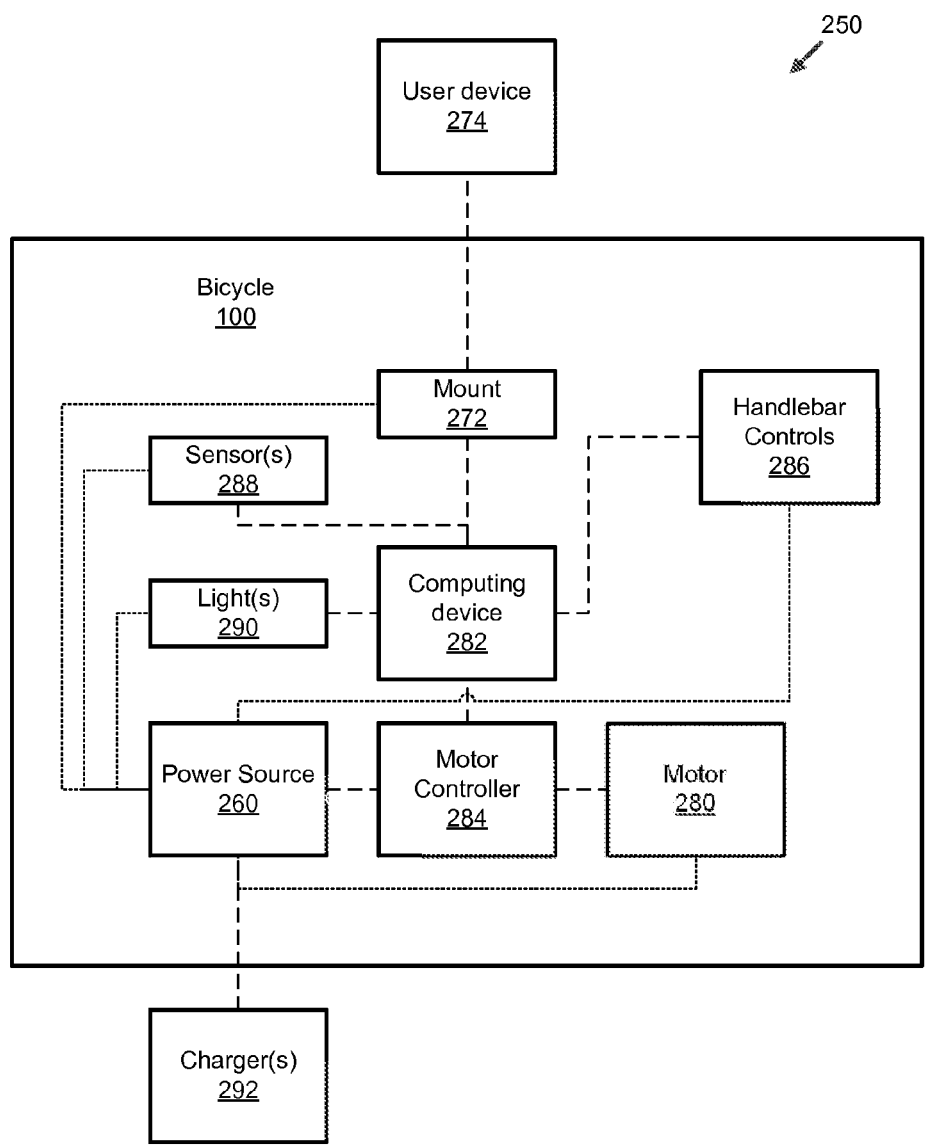
FIG. 13 is a block diagram of an exemplary bicycle power and control system for a bicycle according to the principles of the present disclosure.

With additional reference to the schematic illustration of the power and control system 250 of the bicycle 100 of FIG. 13, the power and control system 250 may include a computer or microcontroller 282 including a processor and a memory, the memory including one or more forms of computer-readable media, and storing instructions executable by the processor for performing various operations, including as disclosed herein. Further, the computer 282 may include more than one computing device, e.g., controllers or the like included in the bicycle 100 for monitoring and/or controlling various components. The computer 282 is generally configured for communications on a controller area network (CAN) bus or the like. Via the CAN bus and/or other wired or wireless mechanisms, the computer 282 may transmit messages to various devices in bicycle and/or receive messages from the various devices, e.g., controllers, actuators, sensors, etc. Alternatively or additionally, in cases where the computer 282 actually comprises multiple devices, the CAN bus or the like may be used for communications between devices represented as the computer 282 in this disclosure. In addition, the computer 282 may be configured for communicating with a network, which, may include various wired and/or wireless networking technologies, e.g., cellular, Bluetooth, wired and/or wireless packet networks, etc.

The power and control system 250 includes a motor controller 284 in communication with the computer 282 for operating the motor 280 of the bicycle 100. The computer 282 is configured to receive information from the user device 274, through the mount 272, and/or handlebar controls 286 supported on one or more of the handlebars 194a, 194b. The user device 274 and/or the handlebar controls 286 may include electro-mechanical interfaces such as buttons—such as the tow button 402 of the handlebar 194a described herein with respect to FIG. 3, knobs and dials, as well as other human machine interfaces, such as an interactive voice response system, a graphical user interface (GUI) including a touchscreen or the like, etc.

The computer 282 is also configured to receive information from one or more sensors 288 related to various components or conditions of the bicycle 100, e.g., a proximity sensor for detecting another nearby vehicle and a cadence and torque sensor for the pedaling of the user, such as, by way of non-limiting example, a cadence and torque sensing bottom bracket. The sensors 288 may also include components such as rear wheel speed and rotational position sensors, such as a hall effect sensor built into the motor 280, sensors for current and/or voltage consumption by the motor 280, a vehicle proximity sensor, and battery temperature and power level sensors. The sensors 288 are in communication with the computer 282 and electrically coupled to the power source 260. Further, the sensors 288 could include global positioning system (GPS) equipment, etc., to provide data directly to the computer 282, e.g., via a wired or wireless connection. The sensors 288 could include communication devices to send and receive information from other vehicles, such as proximity and speed. In other examples, the sensors 288 could include mechanisms such as RADAR, LADAR, sonar, etc., sensors that could be deployed to measure a distance between the bicycle 100 and other vehicles or objects. Yet other sensors 288 could include cameras, motion detectors, or other mechanisms to detect a position, change in position, rate of change in position, etc., of the bicycle 100 or its components. A memory of the computer 282 generally stores data collected from the sensors 288.

The system 250 may further include one or more lights 290 in communication with the computer 282 and electrically coupled to the power source 260, such as head lamps, tail lamps 291 (FIG. 3), turn signals, and front and rear peripheral down lamps. For example, as controlled by the computer 282, the peripheral down lamps may project a lighted border around the bicycle 100 during operation, to communicate a safe proximity for other vehicles. In another example, the computer 282 could activate the tail lamps 292 upon depression of one of the brake handles 196a, 196b. The system 250 is further configured to couple to chargers 292 for recharging the power source 260, including chargers adapted for use in buildings, charging stations, and/or cars, and/or chargers independently generating electrical energy, e.g. solar cells.

In some examples, system elements, e.g. for the power and control system 250 of the bicycle 100, may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Exemplary Process Flows

Figure 14:
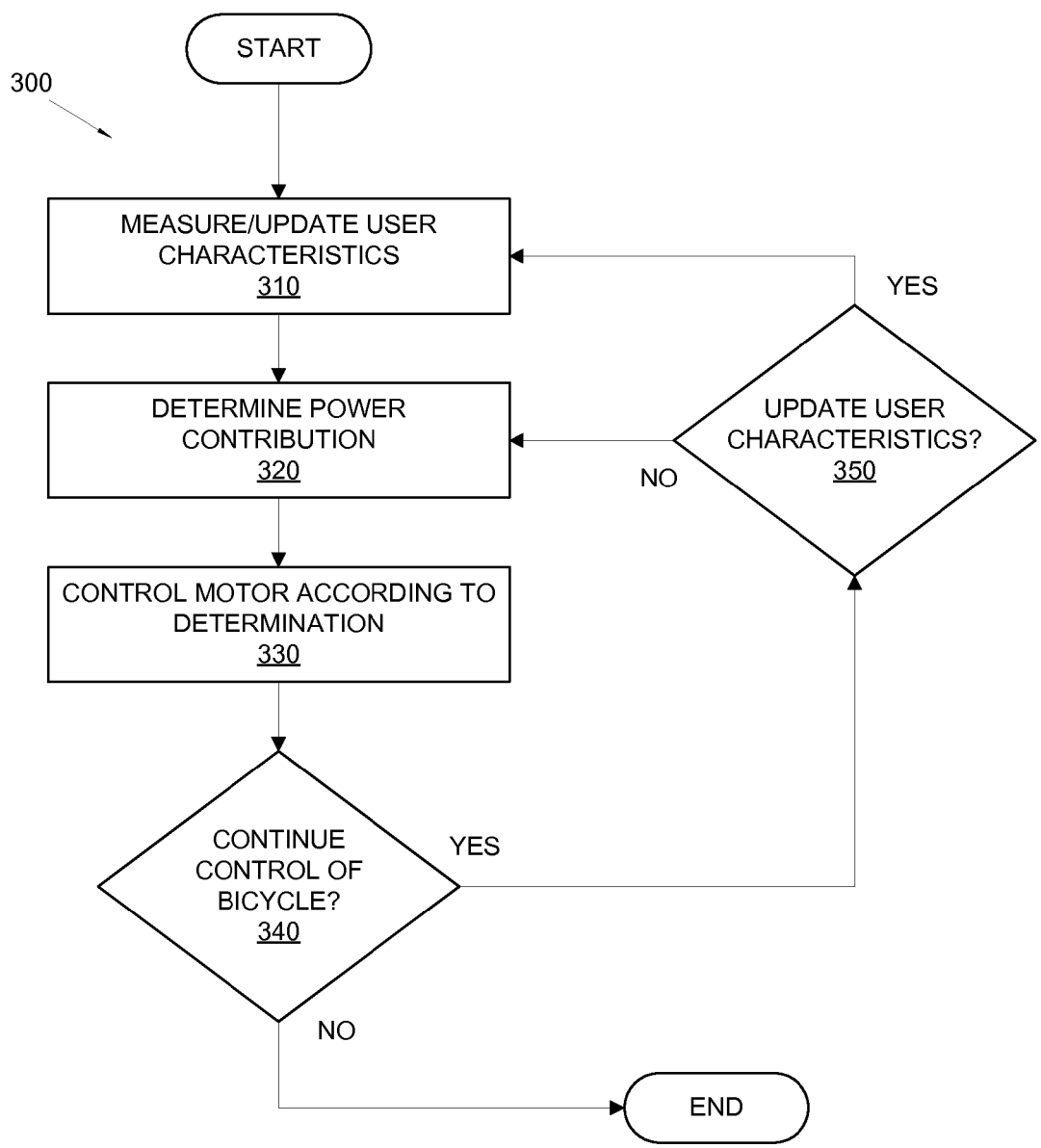
FIG. 14 is a flow chart of an exemplary process that may be implemented by the bicycle power and control system of the present disclosure.

FIG. 14 is a diagram of an exemplary process 300 for the computer 282 to control various bicycle 100 components and/or operations to optimize the effort of the user or assist the user in certain situations based data received from, e.g., the user device 274, the handlebar controls 286, and/or the sensors 288. For example, based on user characteristics such as physiological and biometric factors input by a user, determined by computer 282, e.g. through execution of calibration process instructions for a calibration procedure stored in the memory, and/or measured through the sensors 288 and stored in the memory of the computer 282, together with instructions, algorithms, programs and equations stored in the memory of the computer 282, the computer 282 of the bicycle 100 may determine electrical motor output and provide features such as launch assist forces at an intersection and/or when climbing, pedal cadence optimization and bicycle batter range optimization.

The exemplary process 300 begins in a block 310, in which user characteristics are measured and/or updated through the computer 282, the sensors 288, the user device 274 and/or the handlebar controls 286 and stored in the memory of the computer 282. User characteristics may include, for example, physiological and biometric factors such as pedaling power, pedaling force, pedaling cadence, weight, comfort level, riding skill, aerodynamic form, clothing and fitness level. In one example, to measure the user characteristics of pedaling force and pedaling cadence, the computer 282 may include software or instructions for a defined test or calibration process or mode in which these factors are directly measured (e.g. pedal cadence) and/or determined (e.g. pedaling force as a function of applied torque). In such an exemplary implementation, measured user performance values, e.g. pedaling cadence and pedaling torque, may be arranged and stored by the computer 282 through population of one or more data arrays in the memory thereof, per a prescribed automated calibration sequence also stored in the memory thereof. User characteristics may be calculated from the one or more data arrays. In another example, a user may input or deliver user characteristics through the user device 274 and/or the handlebar controls 286, through manual entry, or through stored measurement or determination of the user characteristics with other software, mechanisms or machines (e.g., a stationary bicycle or other exercise equipment). Yet other user characteristics may be directly measured, such as weight. In another example, the user characteristics may have been previously stored in the memory of the computer 282, and the bicycle updates the user characteristics based measurements of the use of the bicycle 100 or a new test or calibration mode operation.

With user characteristics determined, the process continues in a block 320, in which the computer 282 determines the power contribution from the motor 280 for an operating condition of the bicycle 100, e.g., the incline of the path, the current velocity, and/or the proximity of the bicycle 100 to other vehicles, as may be sensed through the sensors 288. For example, if the bicycle 100 is configured to provide power assistance during acceleration at intersections, to help prevent the user from slowing traffic, the bicycle 100 may identify the acceleration event from a measured velocity below a particular stored threshold and as a measured pedaling cadence and/or power above certain thresholds. With user characteristics, such as weight, pedaling force and pedaling cadence, the computer 282 may determine operational parameters and/or instructions for the motor controller 284 to activate the motor 280 and enable operation of the bicycle 100 within the user characteristics and other parameters, such as control thresholds and data from the sensors 288 stored in a memory of the computer 282. Control thresholds may include, for example, safety thresholds, such as a maximum speed or bicycle angle, or comfort thresholds, such as maximum pedaling force or rate of acceleration.

With the instructions for controlling the motor 280 determined, next, in a block 330, the computer 282 and/or the motor controller 284 operate the motor 280 according to the instructions. In a block 340, the computer 282 determines whether the control functions are to continue, e.g., whether the bicycle 100 may have reached its destination. If the control of computer 282 is not to continue, e.g. the bicycle has reached its destination and/or is being turned off, the process 300 ends. If the control continues, the process 300 continues to a block 350, in which the computer 282 determines whether the user characteristics are to be updated. If the user characteristics are to be updated, e.g. the computer 282 is operating in a fitness mode designed to adjust to the energy level of the user, the process 300 returns to the block 310. If the user characteristics are not to be updated, e.g. the computer 282 is operating in a power conserve mode based only on static user characteristics, such as weight of the user, the process 300 returns to the block 320.

In one exemplary implementation, the computer 282 may optimize battery range through the process 300, e.g. the computer 282 may continually update the user characteristics to re-optimize the power delivery in order to maximize bicycle performance. In other implementations, the bicycle 100 and the computer 282 may allow the user to determine the extent to which the computer 282 relies on the user characteristics to determine the instructions for operation of the motor 280 in a given operational mode. In additional examples, the operational modes may have different objective outcomes such as: a training mode, where the instructions for operation of the motor 280 are determined according to the user's training or fitness requirements; a cruise control mode, where a speed input, e.g. through the handlebar controls 286, is maintained across varying path conditions; acceleration boost modes, where power is provided at, e.g., intersections or hills, to decrease acceleration time and/or effort; pedal optimization modes, where the assistive power is adjusted so that the rider may maintain a pre-set or measured optimal cadence or pedal power; regenerative charging, where the power and control system 250 and/or the motor 280 include regenerative power mechanisms to recharge the power source 260 on descents or during deceleration; and a range guarantee mode, where a pre-set or measured destination is input, and the bike optimizes performance to ensure the range of the power source 260 extends to the destination. In another example, operational modes may be predetermined to tailor the performance of the bicycle 100 to a particular style, e.g. faster acceleration in a "sporty" setting in any appropriate operational mode. As such, the exemplary process 300 may provide a variety of pedaling cadences without having to individually tailor the gearing of the bicycle 100.

Exemplary Towing Configuration

With reference to FIG. 4, in one implementation, the bicycle 100 may be arranged in a towing configuration 400. In the towing configuration 400, the front and rear wheels 110, 112 are re-positioned on the frame assembly 120, and the front fork tube 122, the head tube 124, the seat tube 128, the chain stay 130, and the pedals 166a, 166b are each folded as described herein with respect to FIGS. 2A-2D. As described in additional detail herein with respect to FIGS. 8A-8C and 9A-9B, the handlebars 194a, 194b are rotated to the towing position illustrated in FIG. 4. In particular, the handlebar 194b is folded along the head tube 124, and the handlebar 194a is extended in the opposing direction, away from the head tube 124 and the top tube 126. The handlebar 194a includes an interface component, such as a tow button 402 on the end thereof, to enable user activation of the power and control system 250 in a towing configuration of the handlebars.

Figure 5A:
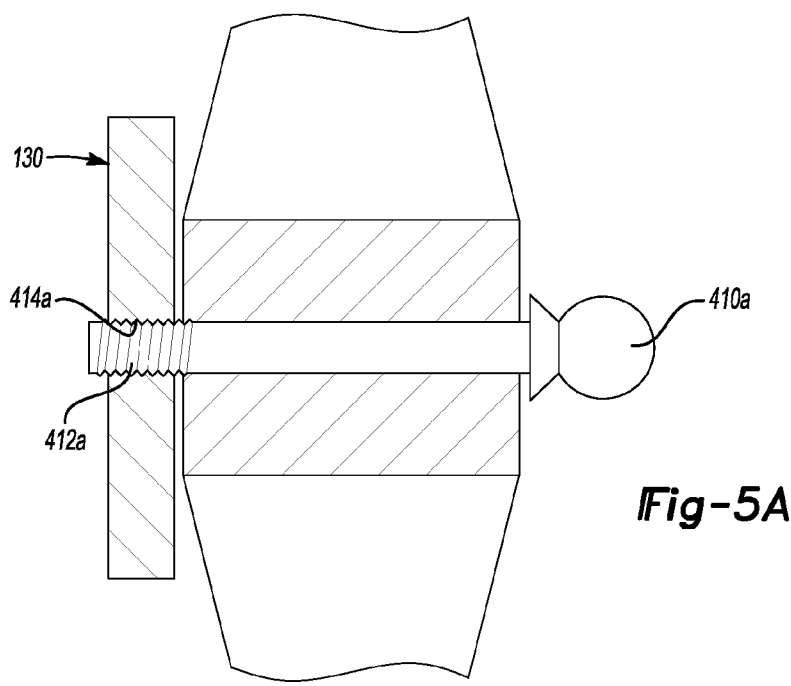
FIG. 5A is a partial cross-sectional view of an auxiliary wheel mount for a towing configuration for a bicycle according to the principles of the present disclosure.

In one implementation, the front and rear wheels 110, 112 are re-positioned on the folded frame assembly 120 with auxiliary wheel mounts 410a (FIG. 5A) and 410b (not shown). It should be understood that the description herein of one of the auxiliary wheel mounts 410a, 410b applies equally to the other of the auxiliary wheel mounts 410a, 410b. The auxiliary wheel mounts 410a, 410b are coupled to opposing outside portions of the chain stay 130. For example, with additional reference to FIG. 5A, the auxiliary wheel mount 410a may be in the form of a post with a thread 412a. The chain stay 130 may include a complementary threaded aperture 414a to receive the auxiliary wheel mount 410a. As such, with the frame assembly 120 in the folded position, the front wheel 110 may be aligned with the aperture 414a, and the auxiliary wheel mount 410a may be extended through the front wheel 110 and threadingly engage the chain stay 130 at the aperture 414a to secure the front wheel 110 to the chain stay 130.

Figure 5B:
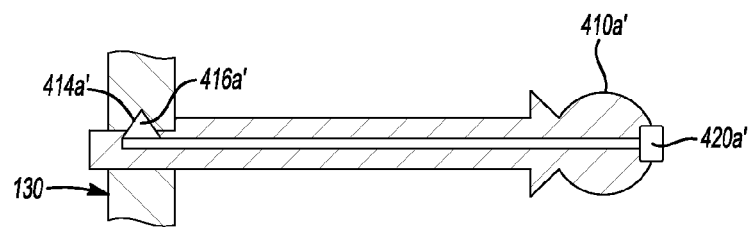
FIG. 5B is a partial cross-sectional view of another auxiliary wheel mount for a towing configuration for a bicycle according to the principles of the present disclosure.

Referring to FIG. 5B, another exemplary auxiliary wheel mount 410a' is illustrated. The auxiliary wheel mount 410a' is configured to engage with notched aperture 414a' of the chain stay 130. The auxiliary wheel mount 410a' includes a selectively operable pin 416a' complementary to the notched aperture 414a' which is operated by a button mechanism 420a'. The auxiliary wheel mount 410a' may secure the front wheel 110 to the chain stay 130 as similarly described herein with respect to the auxiliary wheel mount 410a.

Figure 6:
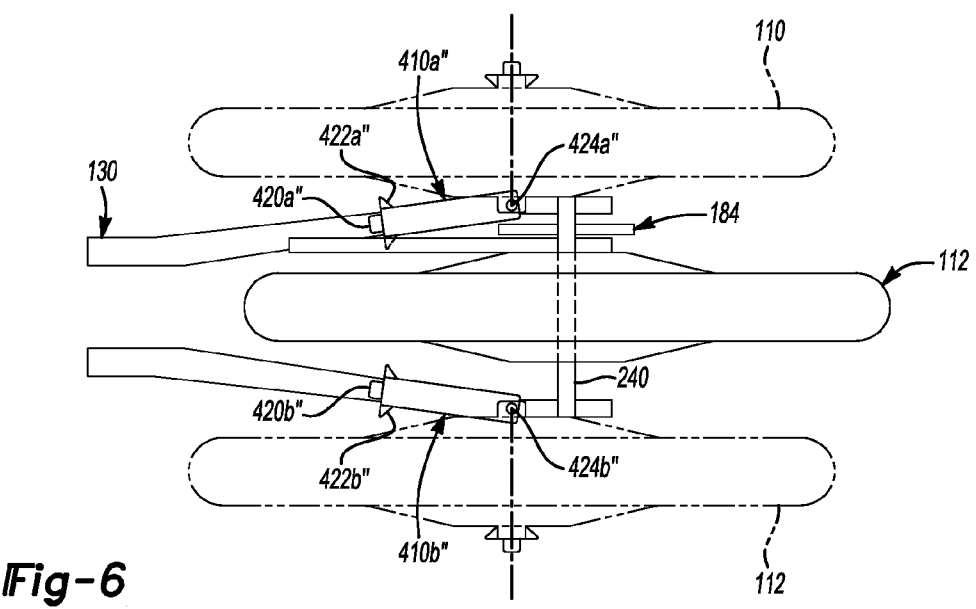
FIG. 6 is a top view of additional auxiliary wheel mounts for a towing configuration for a bicycle according to the principles of the present disclosure.

Referring to FIG. 6, additional exemplary auxiliary wheel mounts 410a", 410b" are illustrated. The auxiliary wheel mounts 410a", 410b" include button mechanisms 420a", 420b" for respectively retracting movable flanges 422a", 422b" at the ends thereof. Furthermore, the auxiliary wheel mounts 410a", 410b" are hinged to the chain stay 130 at mount pivots 424a", 424b", respectively. Accordingly, when arranging the bicycle 100 in the towing configuration 400, the auxiliary wheel mounts 410a", 410b" may be rotated away from the chain stay 130 about mount pivots 424a", 424b", and the button mechanisms 420a", 420b" may be actuated to allow the front and rear wheels 110, 112 to be received on the auxiliary wheel mounts 410a", 410b". When the button mechanisms 420a", 420b" are released, the flanges 422a", 422b" secure the front and rear wheels 110, 112 to the auxiliary wheel mounts 410a", 410b". Another exemplary towing configuration for a bicycle according to the principles of the present disclosure is discussed herein with respect to FIGS. 21 and 28.

A user may manually pull the bicycle 100 in the towing configuration 400. Additionally, in some implementations, when the rear wheel 112 is in the auxiliary position outside of the chain stay 130 in the towing configuration 400 of the bicycle 100, the motor 280 remains in communication with the power and control system 250 and electrically coupled to the power source 260. For example, an auxiliary connection for the power and control system 250 may be disposed within the auxiliary wheel mount 410b. Moreover, the tow button 402 comprises one of the handlebar controls 286 in communication with the computer 282. In such an exemplary implementation, a user may actuate the tow button 402 to propel the bicycle 100 in the towing configuration 400 with the motor 280. The computer 282 may identify the towing configuration 400 via sensors 288 and/or input from user device 274 and/or handlebar controls 286, and may, with the motor controller 284, limit the operation of the motor 280 as appropriate for the towing configuration 400.

The computer may adjust the operation of the motor 280 during use in the towing configuration 400 according to data received from sensors 288, e.g. an inclined or declined surface over which the bicycle 100 is being towed across, the altitude of the towed bicycle, and/or the pressure applied to the tow button 402.

Exemplary Pedal Mount Mechanism

Referring to FIGS. 7A-7C, the pedal mount mechanism 170a is illustrated. The pedal mount mechanisms 170a, 170b are selectively operable to pivot the pedals 166a, 166b respectively between operating positions substantially orthogonal to the respective crank arms 162a, 162b (FIG. 1) and folded positions aligned with the respective crank arms 162a, 162b (FIGS. 2A-2D), in furtherance of selectively configuring the bicycle 100 for, e.g., upright operation (FIG. 1), storage (FIG. 2D) and towing (FIG. 4) It should be understood that the description of the pedal mount mechanism 170a is similarly applicable to the pedal mount mechanism 170b, and such a pedal mount mechanism may be employed in other implementations of bicycle frames and/or bicycles according to the principles of the present disclosure.

The pedal mount mechanism 170a rotatably couples the pedal 166a to the crank arm 162a. In particular, the pedal mount mechanism 170a provides for rotation of the pedal 166a relative to the crank arm 162a in a direction substantially orthogonal to both the length of the crank arm 166a and the pedal axis 168 (FIG. 1). The pedal mount mechanism 170a is configured to receive a pedal stud 439a, and, for example, provide for rotation of the pedal 166a itself in a direction substantially parallel to the pedal axis 168 during operation of the bicycle 100.

The pedal mount mechanism 170a includes first and second pairs of crank arm studs 440a and 442a. The first pair of crank arm studs 440a extend longitudinally from the end of the crank arm 162a opposite the pedal axis 168. The second pair of crank arm studs 442a extend from the inside face of the crank arm 162a, proximate the end of the crank arm 162a with the first pair of crank arm studs 440a. The pedal mount mechanism 170a further includes a bracket 444a having apertures 446a complementarily to the first and second pairs of crank arm studs 440a, 442a. The bracket 444a includes an aperture 447a having a counter-bore (not shown) for receiving a resilient member 448a, e.g. a spring. A retaining component 449a, e.g. a bolt, extends through the spring 448a and the aperture 447a to a mount base 450a. For example, the retaining component 449a may engage a complementary aperture 451a on the mount base 450a. Axle portions 452a extend from opposing sides of the mount base 450a. The mount base 450a is engaged with the stud 439a of the pedal 166a at an aperture 453a. The axle portions 452a rotatably engage apertures 454a on the crank arm 162a.

To support the pedal 166a substantially orthogonal to the crank arm 162a, e.g. for the operating configuration of the bicycle 100 (FIG. 1), the bracket 444a engages the first pair of crank arm studs 440a, and the spring 448a biases the bracket 444a to maintain the engagement. To pivot the pedal 166a to a position substantially longitudinally aligned with the crank arm 162a, e.g. for a storage (FIG. 2D) or towing (FIG. 4) configuration of the bicycle 100, the bracket 444a is disengaged from the first pair of crank arm studs 440a by application of a force to overcome the strength of the spring 448a, acting between the counter-bore of the aperture 447a and the flange or head of the retaining component 449a, and the mount base 450a is rotated about the axle portions 452a. With the pedal 166a substantially longitudinally aligned with the crank arm 162a, the bracket 444a may be released, and the spring 448a biases the bracket 444a into a locked engagement with the second pair of crank arm studs 442a. It should be understood that, to pivot the pedal 166a to the operating position substantially orthogonal to the crank arm 162a from the folded position longitudinally along the crank arm 162a, this method may be reversed.

With further reference to FIGS. 7D-7G, another pedal mount mechanism 170a' may include a lever 454a' for locking and unlocking the bracket 444a' relative to the mount base 450a'. The lever 454a' is rotatably coupled to the retaining component 449a' at an axis 455a'. The lever 454a' includes a cam surface 456a' selectively operable to engage the bracket 444a'. The cam surface 456a' has an offset configuration relative to the axis 455a'.

In the pedal mount mechanism 170a', the bracket 444a' includes an aperture 447a' with a counter-bore 457a' in the opposite orientation of pedal mount mechanism 170a—that is, the counter-bore 457a' opens toward the mount base 450a', as opposed to the retaining component 449a', as the spring 448a' is disposed between the mount base 450a' and the bracket 444a'. The spring 448a' biases the bracket 444a' away from the mount base 450a' and the crank arm 162a' and, e.g., crank arm stud 440a'. The lever 454a' has a locked position (FIGS. 7D, 7F) in which a portion of the cam surface 456a' displaced relatively further from the axis 455a' engages the bracket 444a', causing the spring 448a' to compress and the bracket 444a' to engage the crank arm stud 440a'. The lever 454a' further may be rotated to an unlocked position (FIGS. 7E, 7G) in which a portion of the cam surface 456a' displaced relatively closer to the axis 455a' engages the bracket 444a', allowing the spring 448a' to bias the bracket 444a' away from the mount base 450a' and the crank arm 162a' and permit rotation of the mount base 450a' relative to the crank arm 162a' as described above with respect to the pedal mount mechanism 170a.

Exemplary Handlebar Folding Mechanism

Referring to FIGS. 8A-8C and 9A-9B, the handlebar folding mechanism 192 of the bicycle 100 is illustrated. The handlebar folding mechanism 192 is selectively operable to rotate the handlebars 194a, 194b between operating positions substantially orthogonal to the stem 190 and the head tube 124 (e.g. FIG. 1) and folded positions aligned with, or extending away from the stem 190 and the head tube 124 (e.g. FIGS. 2A-2D, FIG. 4), in furtherance of selectively configuring the bicycle 100 for, e.g., upright operation (FIG. 1), storage (FIG. 2D) and towing (FIG. 4).

The handlebar folding mechanism 192 includes first and second handlebar brackets 460, 462, a base 464 and a top plate 466. The base 464 is fixed to a collar 468 (FIGS. 3-4) rotatably coupled to the stem 190. The first and second handlebar brackets 460, 462 are coupled to the handlebars 194a, 194b, respectively. The first and second handlebar brackets 460, 462 are rotatably sandwiched between the base 464 and the top plate 466. The handlebar folding mechanism 192 further includes a button 470 with a tab 472 coupled to a spring 474. Collectively, the first and second handlebar brackets 460, 462, the base 464 and the top plate 466 define a recess 480 including a notch 484, and the button 470 and associated components extend within the recess 480. Each of the first and second handlebar brackets 460, 462 include a plurality of apertures for cooperating with the notch 484 and, thereby, defining fixed positions for the handlebars 194a, 194b relative to the base 464.

Figure 8A:
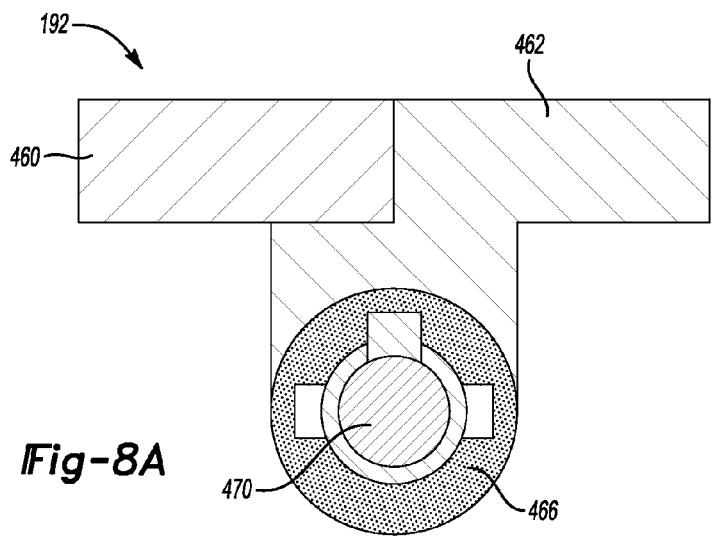
FIG. 8A is a top view of a handlebar folding mechanism for a bicycle according to the principles of the present disclosure in an operating position.
Figure 8B:
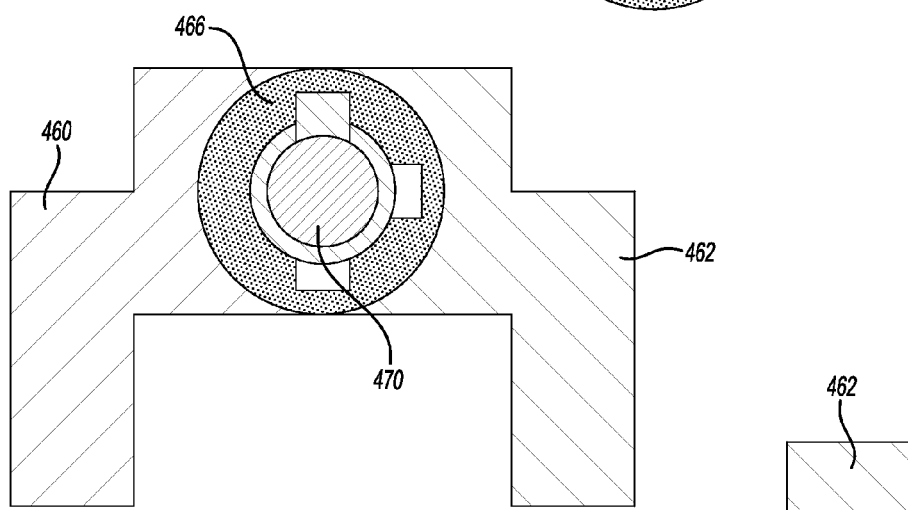
FIG. 8B is a top view of the handlebar folding mechanism of FIG. 8A in a folded position.
Figure 8C:
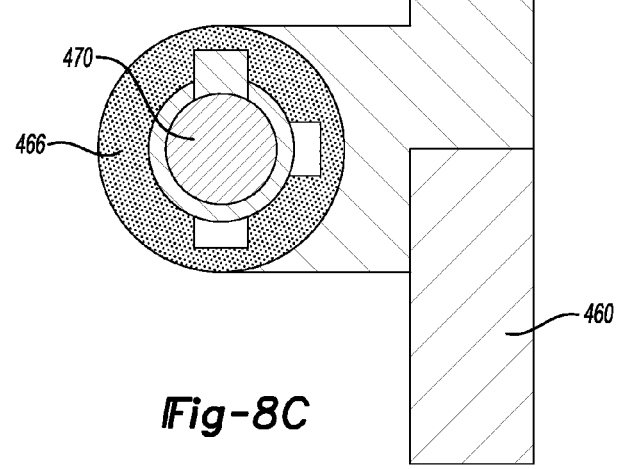
FIG. 8C is a top view of the handlebar folding mechanism of FIG. 8A in a position for a towing configuration for a bicycle according to the principles of the present disclosure.
Figure 9A:
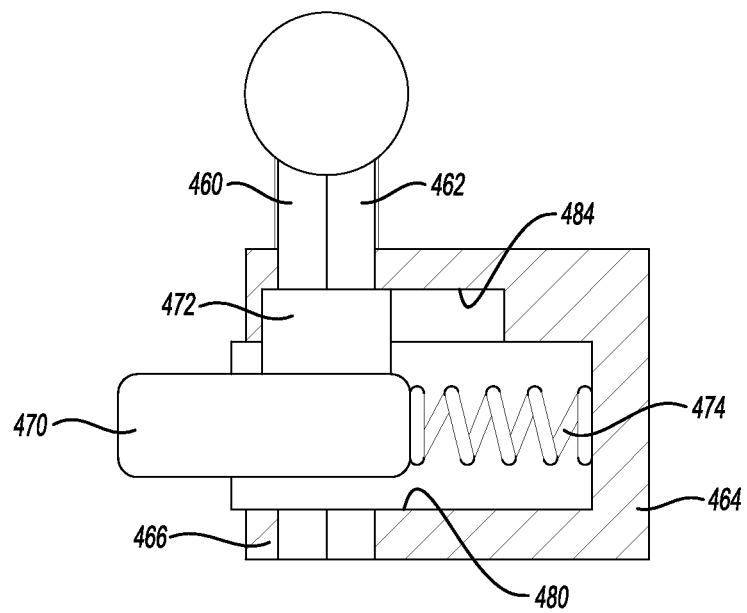
FIG. 9A is a partial cross-sectional view of the handlebar folding mechanism of FIG. 8A.
Figure 9B:
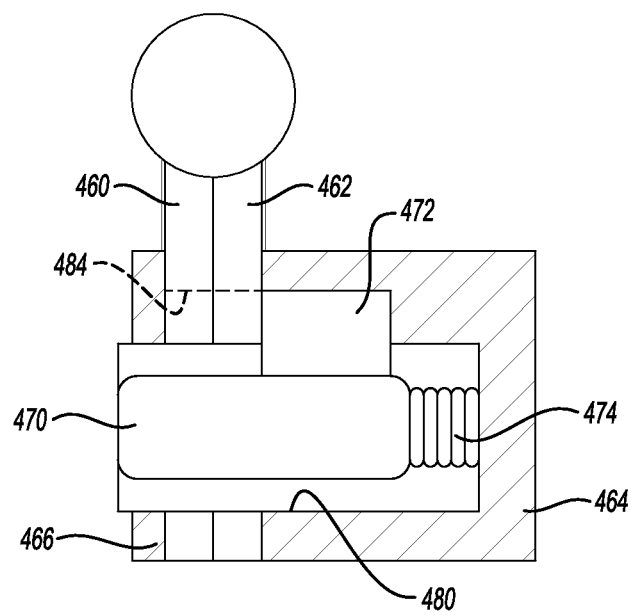
FIG. 9B is another partial cross-sectional view of the handlebar folding mechanism of FIG. 8A.

Referring in particular to FIGS. 8A-8C and 9A, when the spring 474 biases the button 470 outward, the tab 472 of the button extends into the notch 484 to mechanically lock the first and second handlebar brackets 460, 462 relative to the base 464. To change the position of one or both of the first and second handlebar brackets 460, 462, as shown in FIG. 9B, the button 470 is depressed such that tab 472 disengages the first and second handlebar brackets 460, 462. The first and second handlebar brackets 460, 462 may be rotated about the single common pivot—about the recess 480—as desired to align a different aperture as a part of the notch 484, to provide a desired configuration of the handlebars 194a, 194b. For example, as shown in FIG. 8A, the first and second handlebar brackets 460, 462 are configured to position the handlebars 194a, 194b in the operating position of FIG. 1, i.e., substantially orthogonally to the side of the stem 190. In another example, as shown in FIG. 8B, the first and second handlebar brackets 460, 462 are configured to position the handlebars 194a, 194b in the folded position of FIGS. 2A-2D, i.e., substantially along the stem 190 and the head tube 124. In another example, as shown in FIG. 8C, the first and second handlebar brackets 460, 462 are configured to position the handlebars 194a, 194b to provide the towing configuration 400 of FIG. 4, i.e., the handlebar 194b is folded along the head tube 124, and the handlebar 194a is extended in the opposing direction, away from the head tube 124 and the top tube 126.

Exemplary Wheel Couplings

Figure 10A:
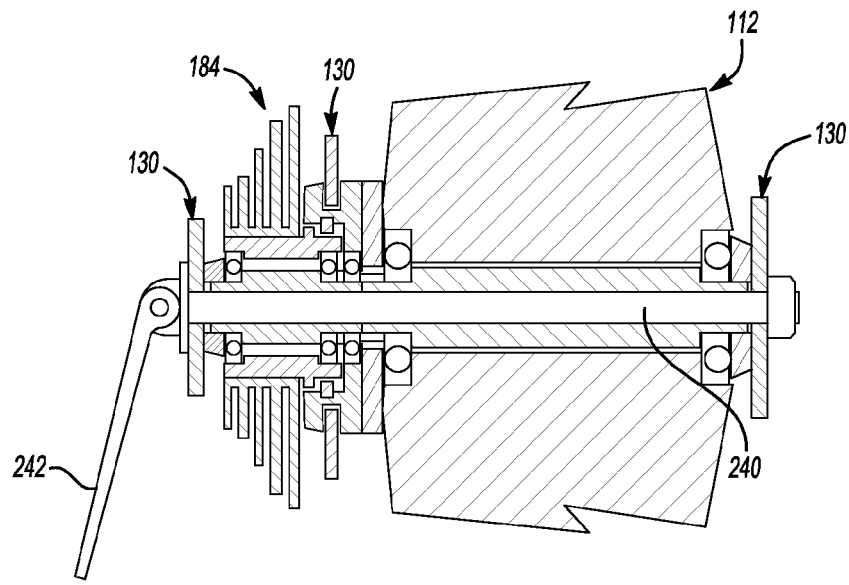
FIG. 10A is a cross-sectional view of a rear wheel assembly for a bicycle according to the principles of the present disclosure.
Figure 10B:
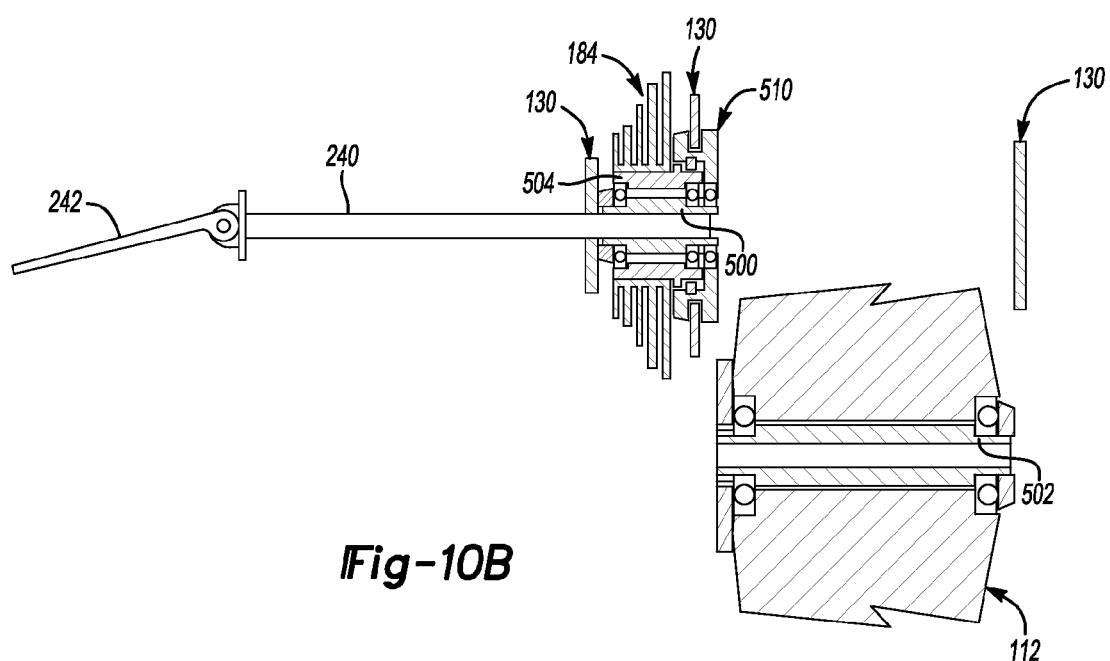
FIG. 10B is a cross-sectional view of a rear wheel assembly for a bicycle according to the principles of the present disclosure with the rear axle and rear wheel disengaged from the frame assembly.

Referring to FIGS. 10A-B and 11, couplings 510 for selectively engaging the front and rear wheels 110, 112 to the frame assembly 120 of the bicycle 100 are illustrated. The engagement of one of couplings 510 and the frame assembly 120, at the chain stay 130 for the rear wheel 112, is illustrated in FIGS. 10A-B; it should be understood that the engagement of one of the couplings 510 and the frame assembly 120 at the front fork tube 122 for the front wheel 110 is similar as to the operation of the coupling 510 and the corresponding wheel axle.

As shown in FIGS. 10A-10B, the rear axle 240 extends through three spaced apart portions of the chain stay 130, as well as the rear wheel 112, to couple the rear wheel 112 to the bicycle 100 in the operating configuration of FIG. 1. The bicycle 100 includes a first axle sleeve 500 radially between the rear axle 240 and the rear gear cassette 184, and the rear wheel 112 includes a second axle sleeve 502 for receiving the rear axle 240. A free hub 504 is disposed radially between the first axle sleeve 500 and the rear gear cassette 184. The first axle sleeve 500, the free hub 504 and the rear gear cassette 184 are all axially between two of the portions of the chain stay 130 such that, when the rear wheel 112 is disengaged from the chain stay 130, the first axle sleeve 500, the free hub 504 and the rear gear cassette 184 all remain coupled to the chain stay 130.

With additional reference to FIG. 11, the coupling 510 has first and second components 512, 514 respectively coupled to the bicycle 100 and one to the rear wheel 112. The first component 512 has a through hole 520 for the rear axle 240 and an axial recess 522 defined therein. The axial recess 522 has a rectangular portion proximate the through hole 520 and a wedge-shaped portion extending from the rectangular portion to the periphery of the first component 512. The first component 512 is rotatably coupled to the chain stay 130 of the bicycle 100 with the recess 522 facing away from the rear gear cassette 184 toward the rear wheel 112, or the space for receiving the rear wheel 112. The first component 512 may also include apertures 524 such that the center of gravity of the first component 512 is disposed toward the peripheral opening of the recess 522, e.g. that opening is at the relatively heavy end of the first component 512, so as to facilitate attachment of the rear wheel 112 thereto, as described herein.

The second component 514 of the coupling 510 is coupled to the rear wheel 112. The second component 514 has a through hole 530 for the rear axle 240 and an axial protrusion 532 extending therefrom. The protrusion 532 is complementary shaped to the recess 522 of the first component 512, with rectangular and wedge-shaped portions. The protrusion 532 may also displace the center of gravity of the second component 514 toward the protrusion 532 such that it constitutes the relatively heavy end of the second component 514.

To attach the rear wheel 112, the rear wheel 112 is positioned within the chain stay 130 such that the first and second components 512, 514 of the coupling 510 face and align with one another and the protrusion 532 of the second component 514 engages the recess 522 of the first component 512. With the displaced/offset centers of gravity disclosed herein, e.g. the opening of the recess 522 being at the relatively heavy end of the first component 512 and the protrusion 532 being at the relatively heavy end of the second component 514, the first and second components 512, 514 of the coupling 510 may automatically align, e.g. under the force of gravity, to facilitate engagement thereof.

Figure 12:
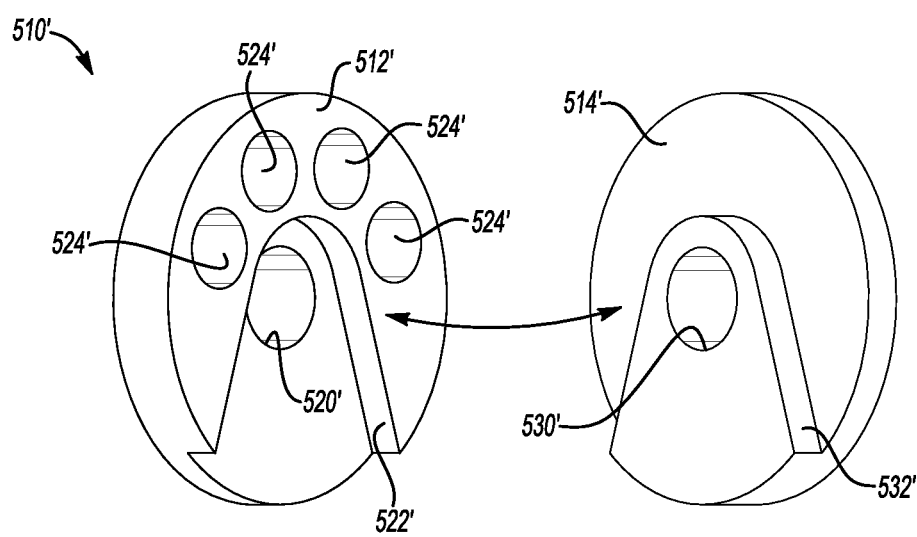
FIG. 12 is a perspective view of another exemplary wheel coupling for a bicycle according to the principles of the present disclosure.

Referring to FIG. 12, another coupling 510' is illustrated, in which the recess 522' of the first component 512' and the protrusion 532' of the second component 514' have complementary rounded-wedge shapes different than the corresponding features of the coupling 510 of FIG. 11.

Another Exemplary Bicycle

Figure 15A:
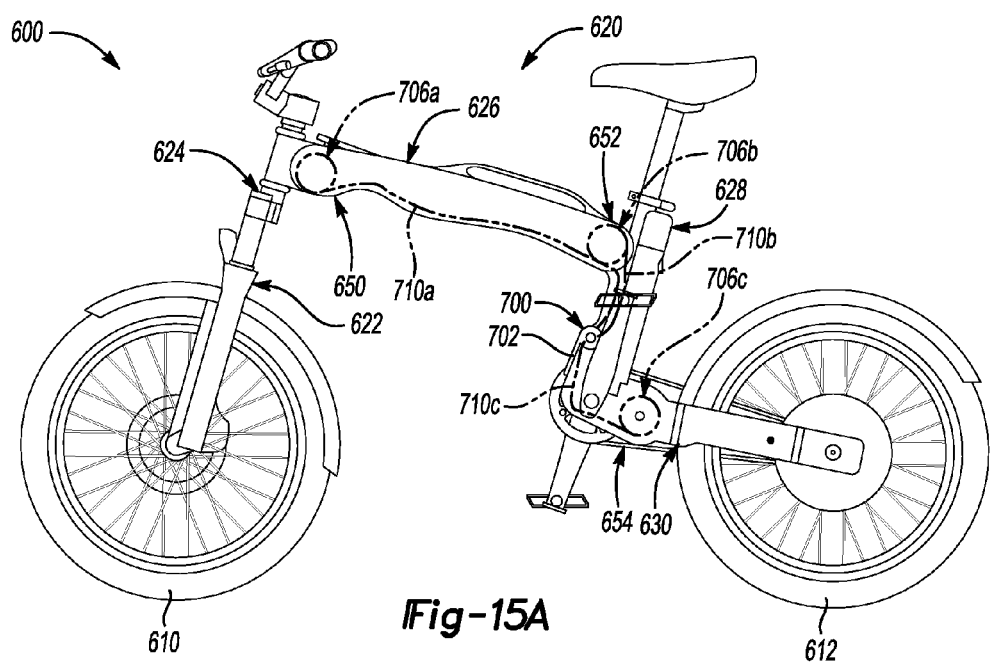
FIG. 15A is a side view of another exemplary bicycle.

FIG. 15A is a side view of another exemplary bicycle 600. It should be understood that the description herein of the bicycle 100 and the components thereof is generally applicable to the bicycle 600 and the respectively similar components thereof, to the extent the bicycle 600 and the components thereof are not identified, illustrated or described distinctly from the bicycle 100. It should be understood that respective components that are distinct between the bicycles 100 and 600 may be substituted for one another, together with any coordinating components, according to the principles of the present disclosure, e.g. the chain stays and the frame pivot locking mechanisms. Additionally, it should be understood that, with respect to the features of the bicycle 600 that are not separately discussed with respect to the description of the bicycle 600 herein and that are similar to or the same as those for the bicycle 100, e.g. the handlebars, the power and control system, and the seat, the respective descriptions of those features with respect to the bicycle 100 shall equally apply to the bicycle 600.

With continued reference to FIG. 15A, the bicycle 600 includes front and rear wheels 610, 612 and a frame assembly 620 with a fork tube 622, a head tube 624, a top tube 626, a seat tube 628 and a chain stay 630. The head tube 624 and the top tube 626 are coupled at a first pivot 650, the top tube 626 and the seat tube 628 are coupled at a second pivot 652, and the seat tube 628 and the chain stay 630 are coupled at a third pivot 654. As illustrated in FIG. 15A, the bicycle 600 may also include folding handlebars, handlebar controls, a chainset assembly with folding pedal mounts, a gear assembly, and a movable seat. The bicycle 600 may also include a power and control system. In the operating configuration of the bicycle 600 illustrated in FIG. 15A (e.g. while being ridden upright by a user), these components have the same overall configuration and function to the respectively similar components of the bicycle 100 in the operating configuration thereof described herein.

Exemplary Frame Pivot Locking Mechanisms

Figure 15B:
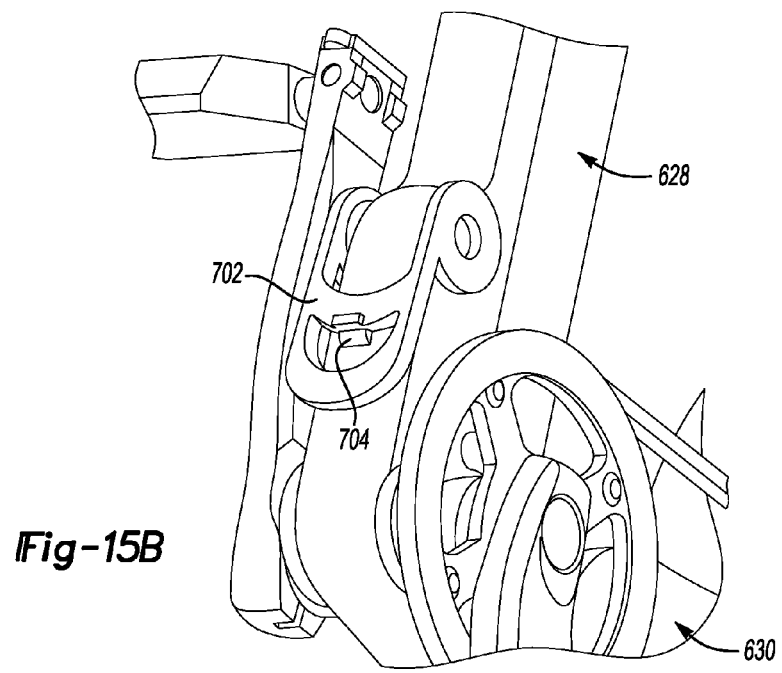
FIG. 15B is a perspective view of a portion of the bicycle of FIG. 15A.

With additional reference to FIG. 15B, which includes a perspective view of a portion of the bicycle 600, the bicycle 600 includes a frame joint locking mechanism 700 supported by the frame assembly 620 and operable to selectively rotatably lock or unlock one or more of the first, second and third pivots 650, 652, 654. The frame joint locking mechanism 700 includes a lever 702 rotatably coupled to a forward-facing exterior portion of the seat tube 628. The lever 702 may be fixed to the seat tube 628 in a locked position by a lever clip 704.

Referring also to FIGS. 16-20, the frame joint locking mechanism 700 may include a pivot bracket assembly at any one or more of the pivots of the frame assembly 620, and a cable component extending between the lever 702 and each pivot bracket assembly, e.g. a first pivot bracket assembly 706a at the first pivot 650 coupled to a first cable component 710a, a second pivot bracket assembly 706b at the second pivot 652 coupled to a second cable component 710b, and a third pivot bracket assembly 706c at the third pivot 654 coupled to a third cable component 710c. It should be understood that, unless otherwise specified herein, the descriptions of each the first, second and third pivot bracket assemblies 706a-c, the first, second and third cable components 710a-c, and the components thereof, may be applicable to one another.

Figure 16:
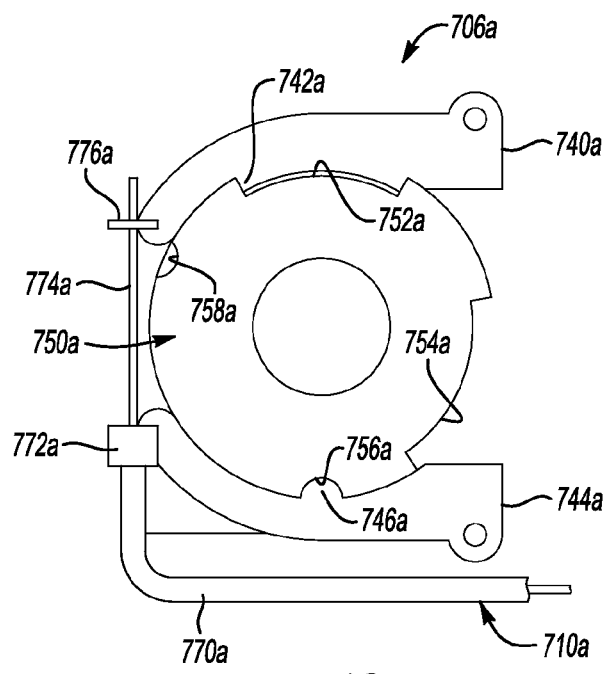
FIG. 16 is a side view of an exemplary bracket and cable assembly for a frame pivot for a bicycle according to the principles of the present disclosure.

One implementation of a pivot bracket assembly according to the principles of the present disclosure is illustrated at FIG. 16, which is a side view of the exemplary first pivot bracket assembly 706a for a frame pivot for the bicycle 600. The first pivot bracket assembly 706a includes a first bracket component 740a having a radially inwardly extending first protrusion 742a and a second bracket component 744a with a radially inwardly extending second protrusion 746a. The first and second bracket components are coupled relative to one of the components of the frame assembly 620 coupled at the first pivot 650, e.g. the head tube 624. The first pivot bracket assembly 706a further includes a gear component 750a coupled to the other of the components of the frame assembly 620 coupled at the first pivot 650, e.g. the top tube 626. The gear component 750a includes a first pair of recesses 752a, 754a in the radially outward periphery thereof, and a second pair of recesses 756a, 758a also in the radially outward periphery thereof. Each of the first pair of recesses 752a, 754a are complementary to the first protrusion 742a of the first bracket component 740a, and each of the second pair of recesses 756a, 758a are complementary to the second protrusion 746a of the second bracket component 744a. The first and second pairs of recesses 752a, 754a, 756a, 758a are configured such that one of the first pair of recesses 752a, 754a may engage the first protrusion 742a while, simultaneously, one of the second pair of recesses 756a, 758a may engage the second protrusion 746a. The gear component 750a is rotatable relative to the first and second bracket components 740a, 744a.

The first pivot bracket assembly 706a is coupled to the first cable component 710a. In this implementation, the first cable component 710a includes an outer portion 770a secured to the second bracket component 744a with a collar 772a. The first cable component further includes an inner portion 774a extending through the outer portion and secured to the first bracket component 740a with a fastener 776a.

The first and second bracket portions 740a, 744a are fixed to a component of the frame assembly 620, e.g. the head tube 624, at the opposite ends thereof, and are configured to have some elasticity, to be compressed in, and spring out of, engagement with the gear component 750a. For example, when the lever 702 is moved to the locked position, the lever 702 pulls the inner portion 774a relative to the outer portion 770a, radially compressing the first and second brackets 740a into engagement with the gear component 750a. The first and second pairs of recesses 752a, 754a, 756a, 758a correspond with operating and storage positions of the bicycle 600, such that when a user is attempting to lock the frame at one of these positions, one of the recesses is aligned with each of the protrusions of the first and second brackets 740a, 744a. Accordingly, as the lever 702 maintains its locked position, the first and second brackets 740a, 744a and the gear component 750—and thus the first pivot 650 of the bicycle 600—remain rotatably fixed.

Each of the pivot bracket assemblies 706a-c and respective cable components 710a-c may be similarly configured, such that operation of the lever 702 may lock any one, two or all three of the pivots of the bicycle 600.

Figure 18:
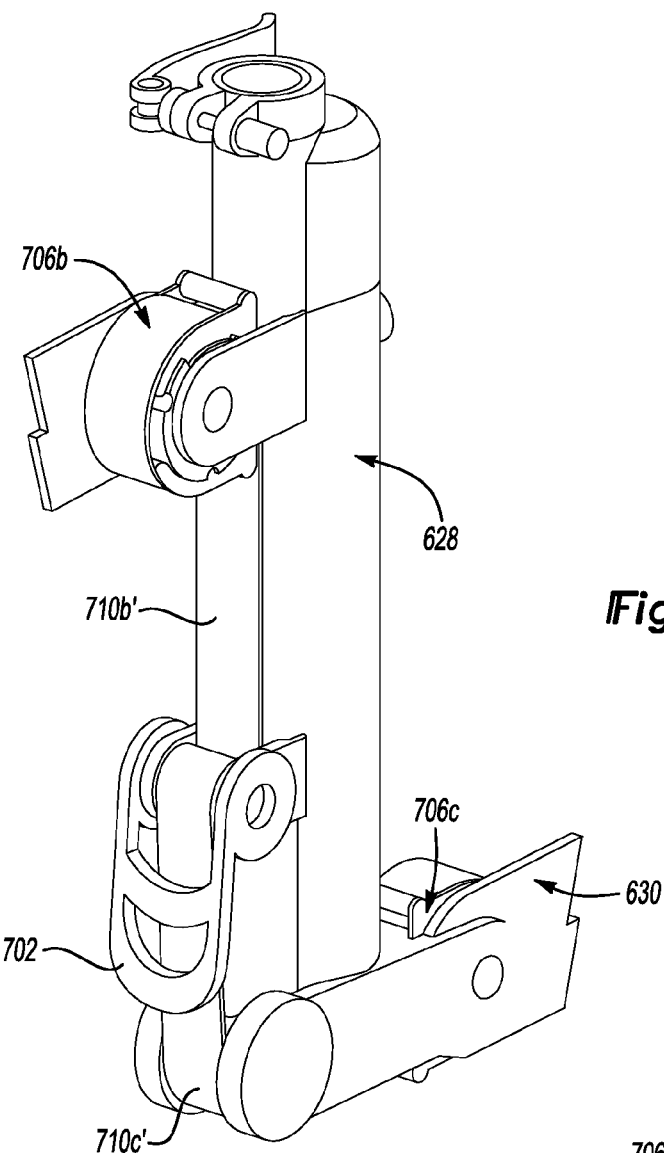
FIG. 18 is a perspective view of a lever and pivot bracket assembly and a partially uncovered seat tube for a bicycle according to the principles of the present disclosure.
Figure 19:
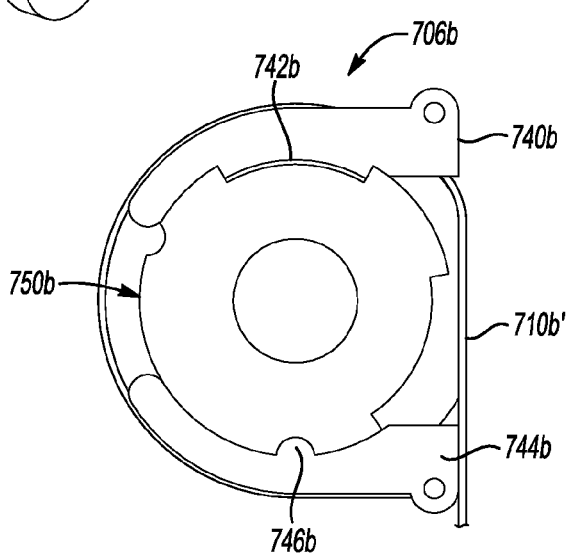
FIG. 19 is a side view of another exemplary bracket and cable assembly for a frame pivot for a bicycle according to the principles of the present disclosure.

Referring to FIGS. 18-19, another implementation of the cable components of the present disclosure is illustrated, with particular reference to the second and third pivot bracket assemblies 706b-c. The cable components 710b'-c' are in the form of a single wide cable. With particular reference to FIG. 19, the cable component 710b' is wrapped around the outside of the first bracket component 740b and the second bracket component 744b and fixed to the second bracket component 744b. Actuation of the lever 702 may tension the cable component 710b' to radially compress the first and second bracket components 740b, 744b into engagement with the gear component 750b.

Figure 20A:
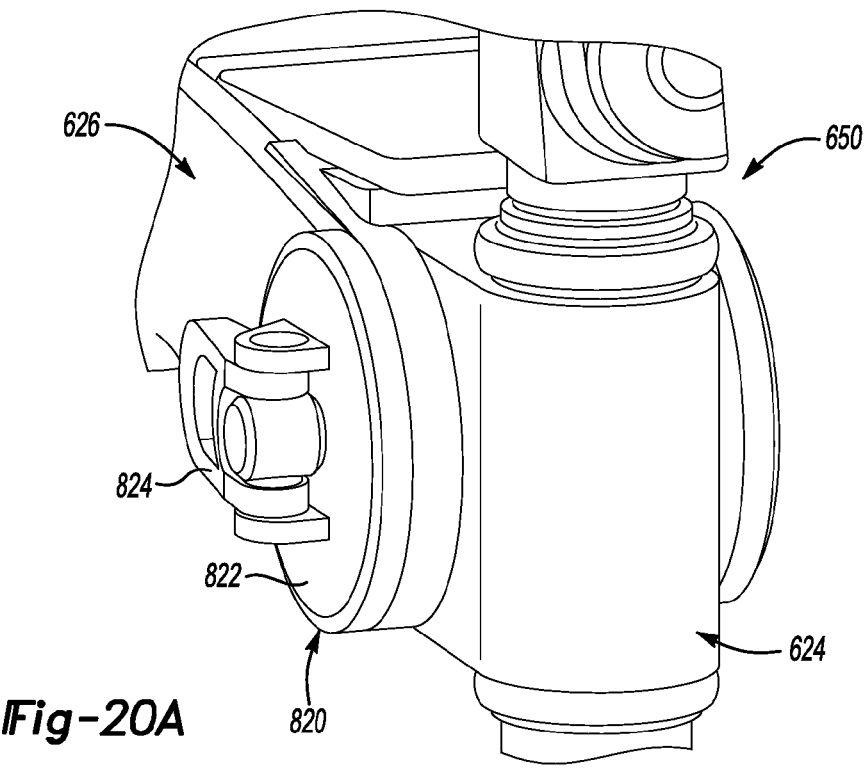
FIG. 20A is a perspective view of an exemplary external locking mechanism for a frame pivot for a bicycle according to the principles of the present disclosure.
Figure 20B:
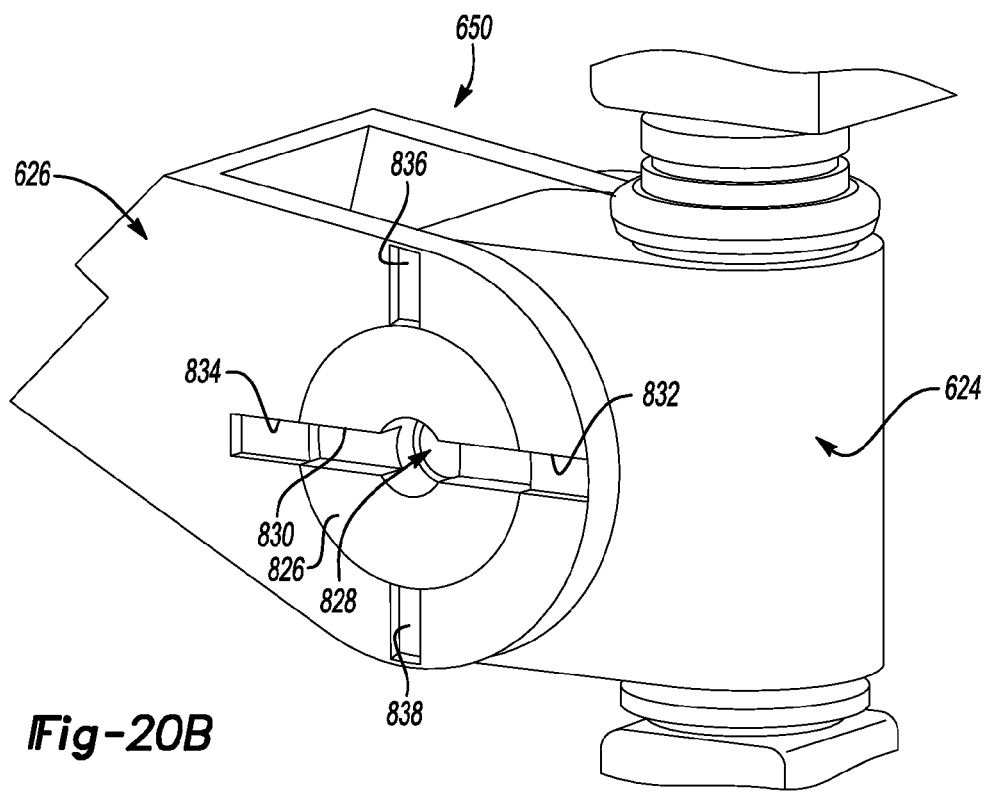
FIG. 20B is a partial perspective view of internal features of the locking mechanism of FIG. 20A.

FIGS. 20A-B illustrate an exemplary external locking mechanism 820 for a frame pivot for a bicycle, which may be used in addition to or as an alternative to any one or more of the pivot bracket assemblies 706a-c. The exemplary external locking mechanism 820 is at the first pivot 650 between the head tube 624 and the top tube 626. The external locking mechanism 820 includes a cap 822 and a lever mechanism 824. The head tube 624 has a round protrusion 826 with a through aperture 628. A groove 830 extends across the protrusion 826 over the aperture 628. The top tube 626 includes a first pair of channels 832, 834 and a second pair of channels 836, 838. When the head tube 624 is rotated relative to the top tube 626 to configure the bicycle 600 in an operating or storage position, the groove 830 aligns with one of the pairs of channels of the top tube 626 for each position. The cap 822 includes a complementary protrusion (not shown) configured to extend across one of the pairs of channels of the top tube 626 and through the groove 830. The lever mechanism 824 locks the cap 822 against the frame assembly 620, and the cap 822 mechanically locks the first pivot 650. The external locking mechanism 820 may include another cap and coordinating features on the head tube 624 and the top tube 626 on the opposite side of the frame 620.

Exemplary Chain Stay Coupling Component

Figure 17A:
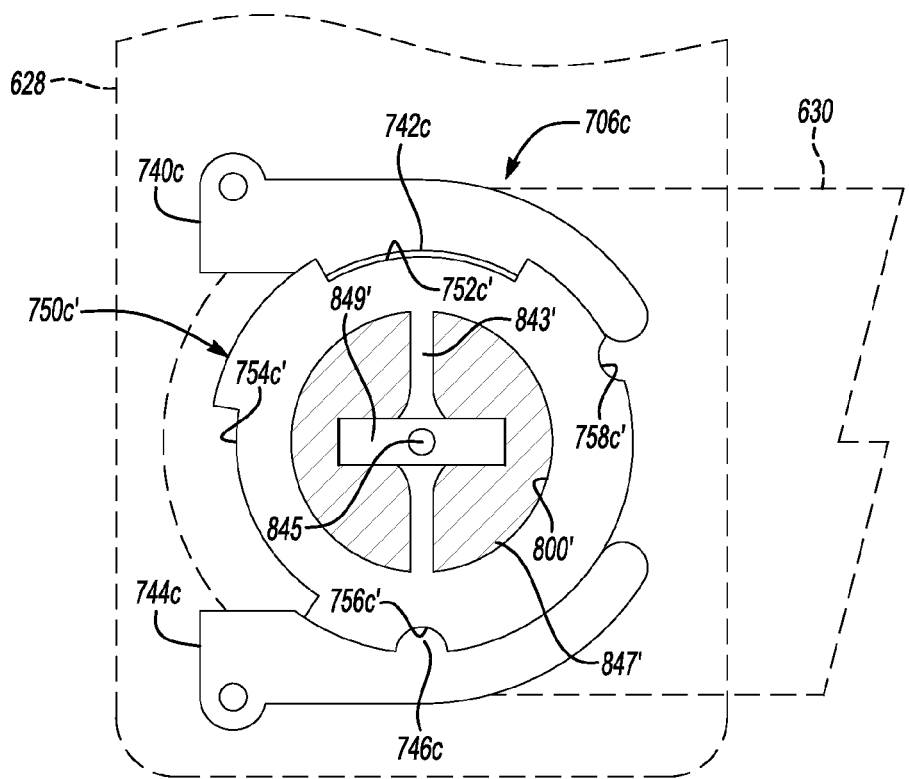
FIG. 17A is a side view of an exemplary bracket assembly for a chain stay pivot for a bicycle according to the principles of the present disclosure.
Figure 17B:
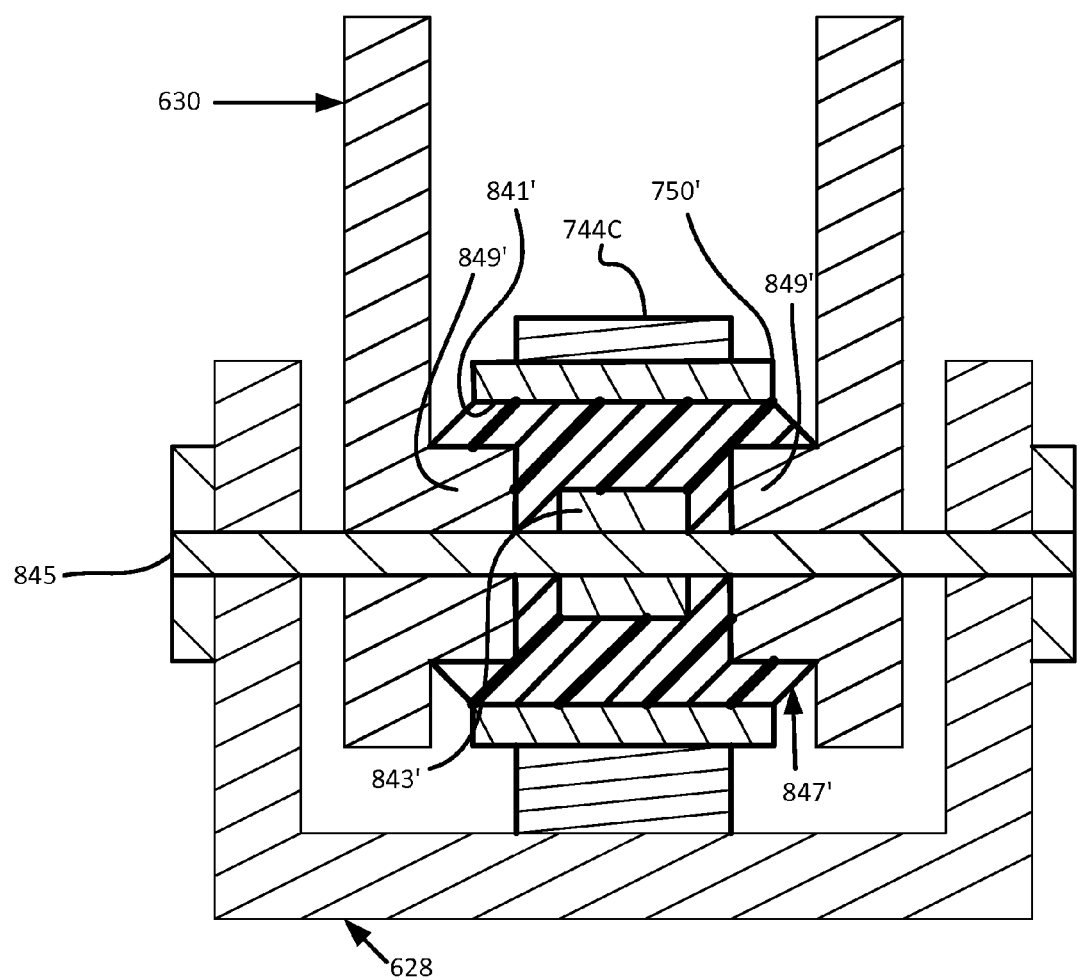
FIG. 17B is a cross-sectional view of the bracket assembly of FIG. 17A.

FIGS. 17A-B illustrate another implementation of the pivot bracket assembly 706c between the seat tube 628 and the chain stay 630, including a gear component 750c' having a recess 841' defined therein. The gear component 750c' includes a support member 843' extending through the recess 841' configured to rotatably couple to a pivot axle 845', that extends through the seat tube 628 and the chain stay 630. A relatively elastic coupling component 847' extends within the recess 841' and around the support member 843' and the pivot axle 845. The coupling component 847' may include an elastomeric material, and may include one or more materials. The coupling component 847' is configured to receive connecting or paddle components 849' of the chain stay 630. Accordingly, relative to the common pivot axle 845, the coupling component 847' is coupled in series between the seat tube 628 and the chain stay 630. As the coupling component 847' is relatively elastic, it provides a user of the bicycle 600 with desirable shock absorption characteristics at the third pivot 654.

Exemplary Folding Chain Stay and Another Exemplary Towing Configuration

Referring to FIGS. 21-23 and 28, the chain stay component 630, operable to pivot the rear wheel between the riding configuration of FIG. 15 and, e.g., a towing position (FIG. 28), is illustrated in detail. The chain stay 630 includes a pivot arm assembly 860 and a drive side assembly 862 on either side of the rear wheel 612 in the riding configuration of FIG. 15. The pivot arm assembly 860 and the drive side assembly 862 extend from a yoke member 864. The drive side assembly 862 includes a first member 870 and a second member 872, which secure the gear assembly for the bicycle 600, with or without the rear wheel 612, as similarly disclosed herein with respect to FIGS. 10A-B and the bicycle 100. The drive side assembly 862 includes a splined wheel coupling 874 on the inside of the second member 872 and an auxiliary front wheel mount 876 on the outside of the first member 870. An axle 880 is configured to extend through the drive side assembly 862 and into the splined wheel coupling 874 to engage the rear wheel 612.

The pivot arm assembly 860 includes first and second portions 900, 902. The first portion 900 is rotatably coupled to the yoke member 864 at a first hinge 904. The second portion 902 is rotatably coupled to the first portion 900 at the end thereof opposite the yoke member 864 with a second hinge 906. An attachment member 908 is fixed on the outside of the first portion 900. A rear axle coupling 910 is rotatably secured to the second portion 902 and the rear wheel 612.

Figure 21A:
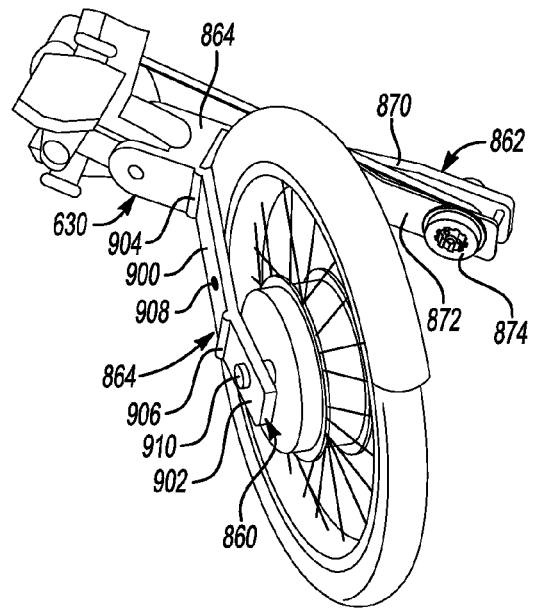
FIG. 21A is a perspective view of an exemplary chain stay component pivoting the rear wheel at a first hinge from the riding configuration of FIG. 15.
Figure 21B:
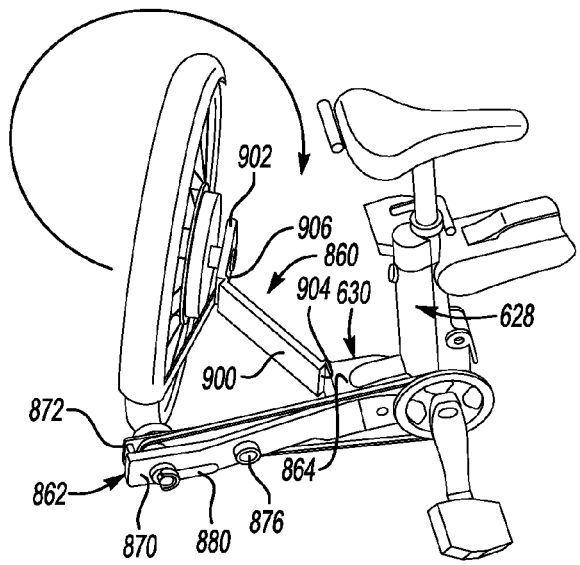
FIG. 21B is a perspective view of the chain stay component of FIG. 21A pivoting the rear wheel at a second hinge.
Figure 21C:
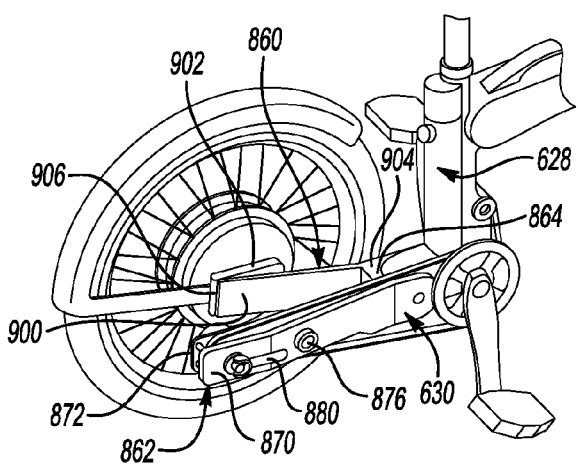
FIG. 21C is a perspective view of the chain stay component of FIGS. 21A-B locating the rear wheel in an auxiliary position substantially axially aligned with an auxiliary wheel mount for the front wheel.
Figure 22:
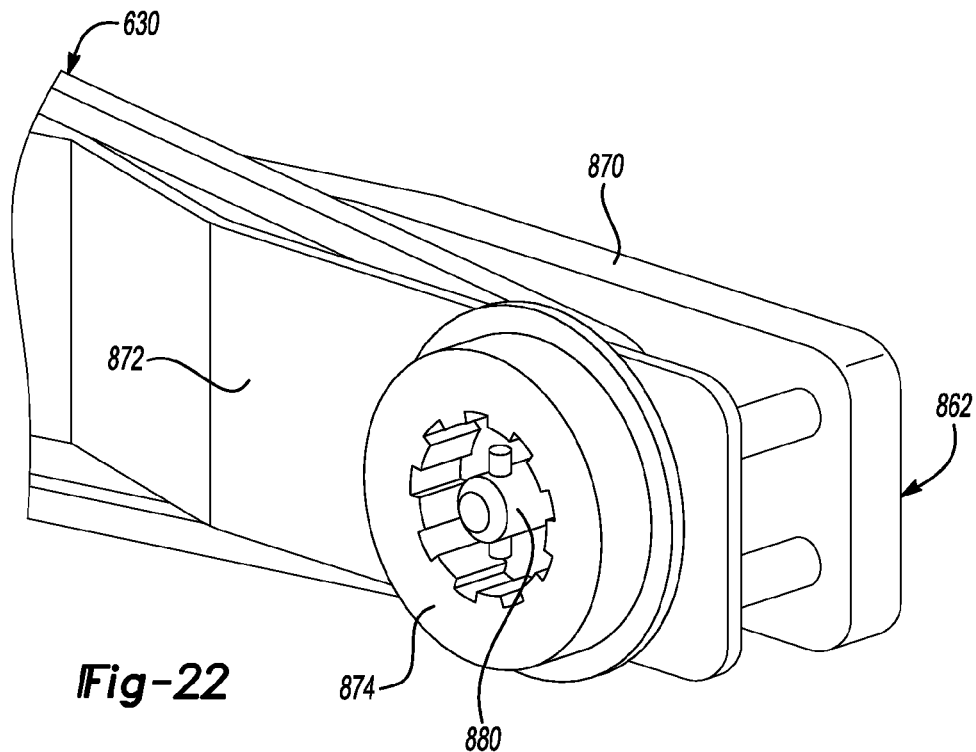
FIG. 22 is a perspective view of an exemplary wheel coupling for a chain stay component for a bicycle according to the principles of the present disclosure.
Figure 23:
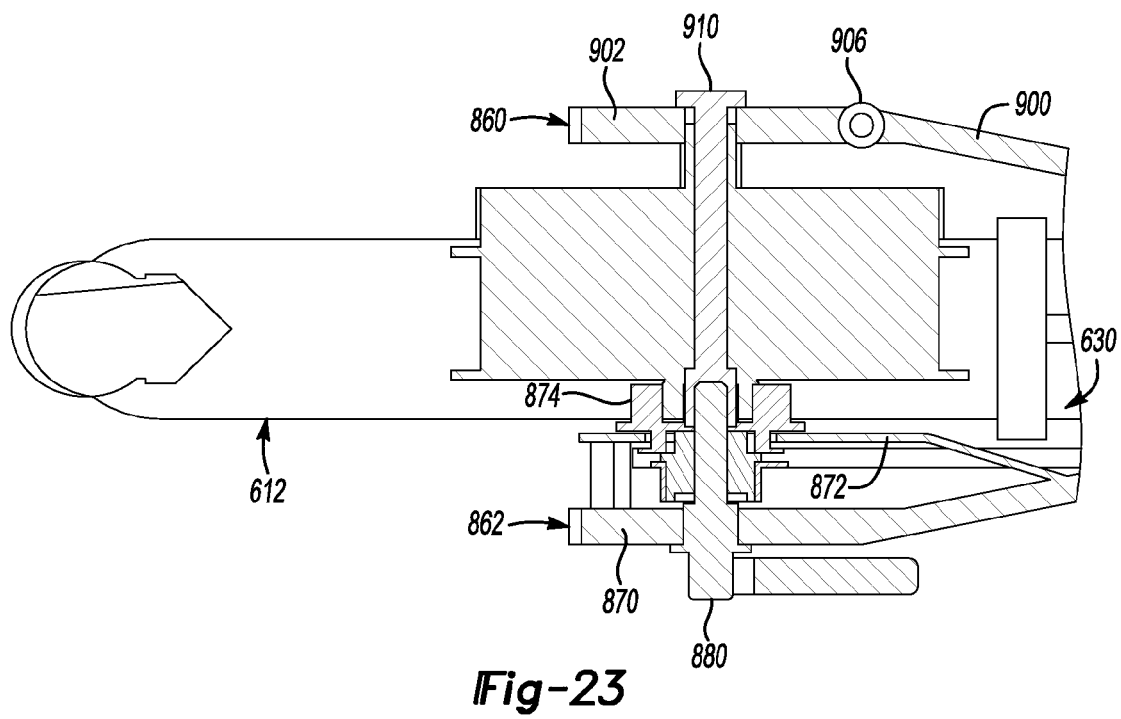
FIG. 23 is a partial top cross-sectional view of an exemplary chain stay component having a pivot arm locating the rear wheel in the riding configuration of FIG. 15.
Figure 24:
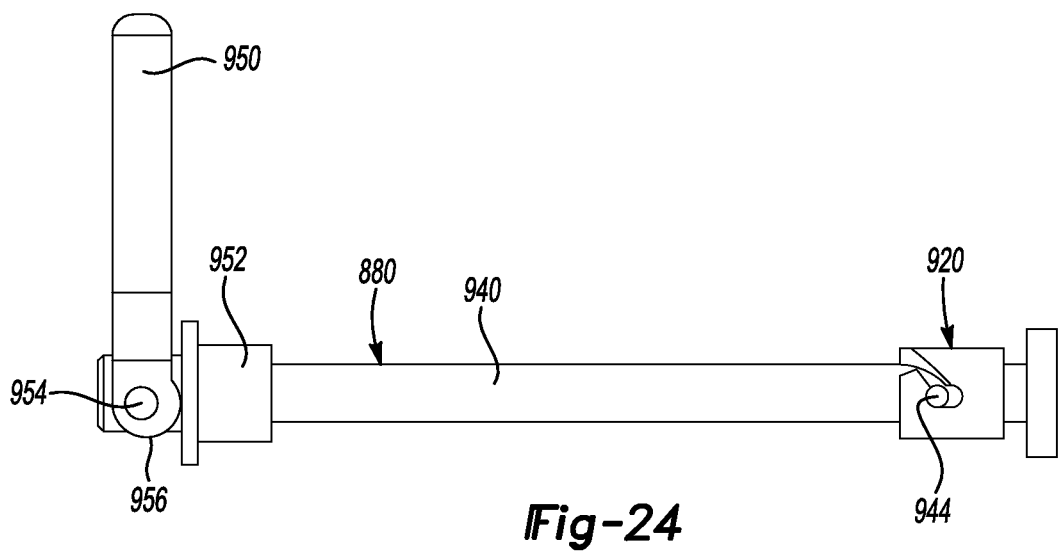
FIG. 24 is a side view of an exemplary wheel axle assembly for a bicycle according to the principles of the present disclosure.
Figure 25:
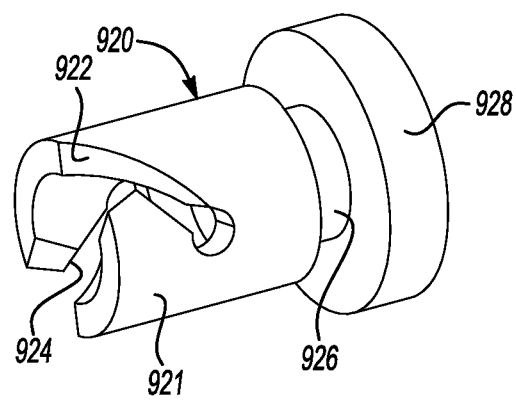
FIG. 25 is a perspective view of an exemplary base component for the wheel axle assembly of FIG. 24.

As shown in FIG. 21A, the chain stay 630 may operate to re-position the rear wheel 612 from the riding configuration of FIG. 15. The pivot arm assembly 860 rotates away from the drive side assembly 862 at the first hinge 904. Referring to FIG. 21B, when the pivot arm assembly 862 is sufficiently rotated to provide clearance for the rear wheel 612, the second portion 902 and the rear wheel 612 are rotated away from the drive side assembly 862 at the second hinge 906. Referring to FIG. 21C, when the second portion 902 is fully rotated to be adjacent the first portion 900, the attachment member 908 couples to the second portion 902 and/or a component thereon, to secure the rear wheel 612 in the alternate position. In one example, the attachment member 908 is a magnet that couples the end of the rear axle coupling 910. The first hinge 904 is biased by any suitable approach, e.g. by a spring therein (not shown) to return the first portion 900 to its configuration along the drive side assembly 862. In this configuration, the rear wheel 612 is axially aligned with the auxiliary front wheel mount 876, and the front wheel 610 may be re-positioned at the auxiliary front wheel mount 876 with an axle 880 as shown in FIG. 28 so that the bicycle 600 may be operating in a towing configuration 1000, such as is described herein with regard to the towing configuration 400 of the bicycle 100. For example, a coupling or connection (not shown) to the power and control system for the bicycle 600 extends through the pivot arm assembly 860 of the chain stay 630 to communicate and power the motor disposed on the rear wheel 612. Another axle 880 may be stowed in the drive side assembly 862 of the chain stay 630.

Figure 29:
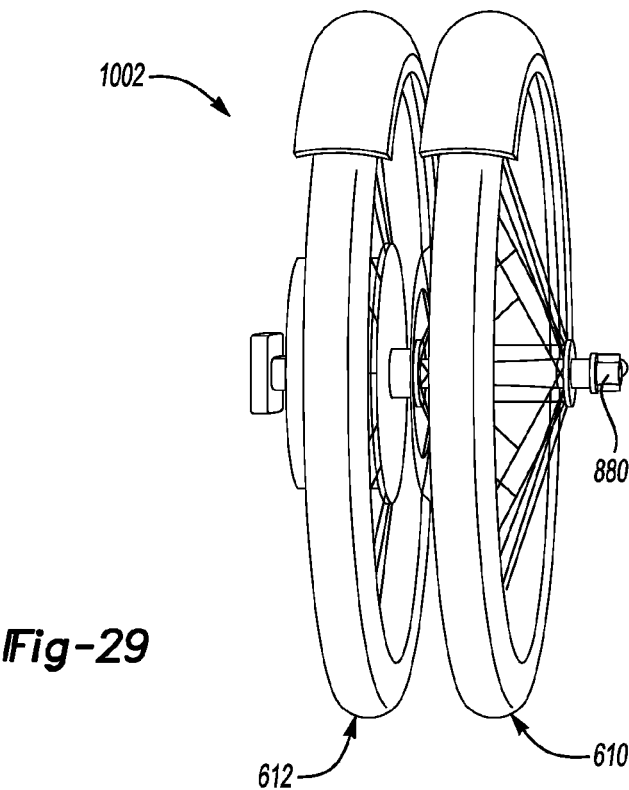
FIG. 29 is a perspective view of front and rear wheels for a bicycle according to the principles of the present disclosure coupled together for storage.

With additional reference to FIG. 29, the rear wheel 612 may be removed from the frame 620, e.g. for transportation or storage. The pivot arm assembly 860 of the chain stay 630 is selectively detachable at the second hinge 906. The front and rear wheels 610, 612 may be coupled in a wheel storage configuration 1002 with an axle 880.

Exemplary Wheel Axle Component

Referring to FIGS. 24-27, an exemplary assembly for the wheel axle 880 for the bicycle 600 is illustrated. The wheel axle 880 selectively connects to an axle coupling 920. The axle coupling 920 includes a substantially cylindrical and hollow main body 921 with complementary recesses 922 and 924 formed in the sidewall thereof. In one implementation, the recesses each have a radially contoured profile with the ends thereof radially displaced approximately 90° from the openings thereof, respectively, around the main body 921. The axle coupling further includes a support shaft 926 and a flange 928. It should be understood that the description herein of the axle coupling 920 equally applies to the axle coupling 910 (FIG. 23), with the axle coupling 910 having a relatively longer support shaft portion. One or more axle couplings 920 may be included at various wheel mounting positions for the bicycle 600, e.g. the auxiliary wheel mount 876 and/or on the fork tube 622 for the primary wheel mount of the front wheel 610.

Figure 26:
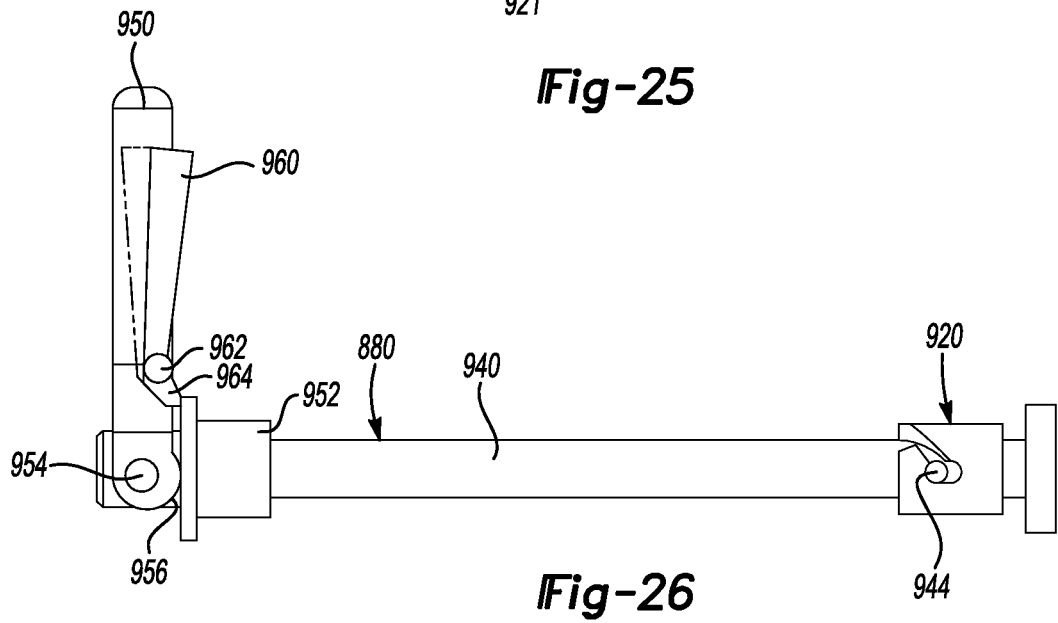
FIG. 26 is a side view of the wheel axle assembly of FIG. 24 with an auxiliary lever attached thereto.
Figure 27A:
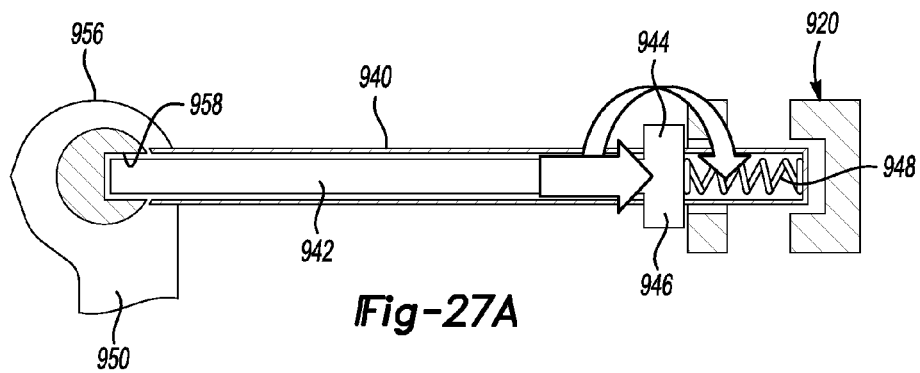
FIG. 27A is a partial cross-view of an initial engagement of the base and main body components of the wheel axle assembly of FIG. 24.
Figure 27B:
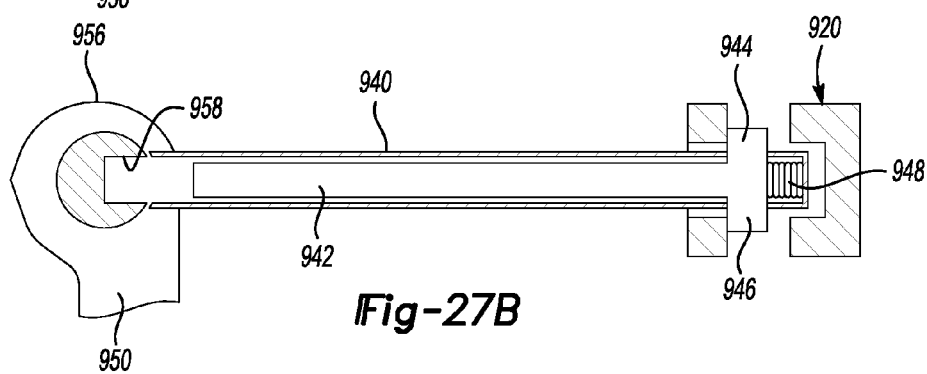
FIG. 27B is a partial cross-view of an engagement of the base component and the bayonet component of the wheel axle assembly of FIG. 24.
Figure 27C:
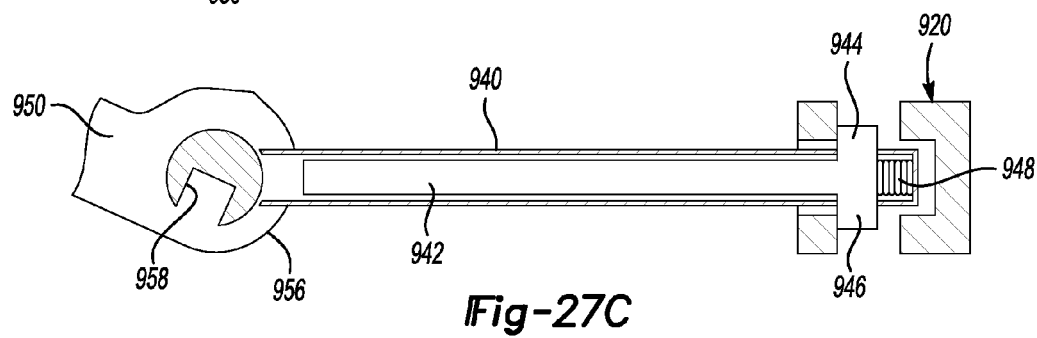
FIG. 27C is a partial cross-sectional view of a rotation of the lever of the wheel axle assembly of FIG. 24 having the base component and the bayonet component engagement of FIG. 27B.
Figure 27D:
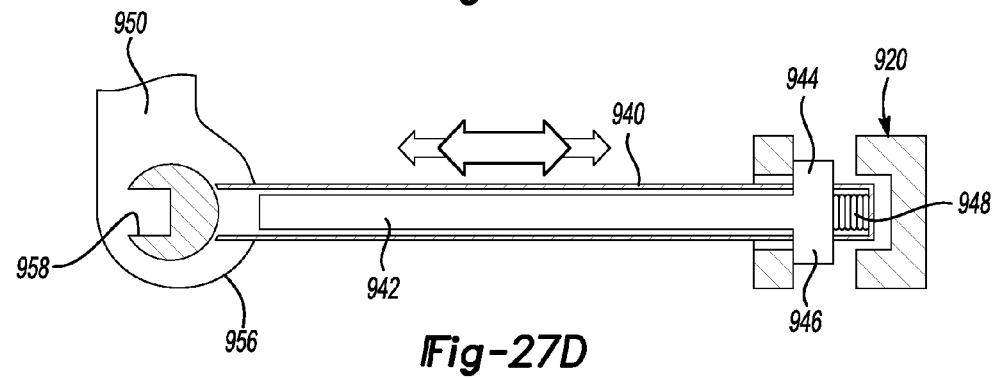
FIG. 27D is a partial cross-sectional view of a further rotation of the lever of the wheel axle assembly of FIG. 24 having the base component and the bayonet component of the shaft engagement of FIG. 27B to tension the main body.

The wheel axle 880 includes a hollow main body 940 and a bayonet member 942 extending inside the main body 940. The bayonet member 942 includes opposing protrusions 944, 946 proximate an end thereof, and the main body includes complementary slots (not shown) through which the protrusions extend. The wheel axle 880 includes a resilient member 948, e.g. a spring, disposed inside the main body 940 between an end thereof and the end of the bayonet member having the protrusions 944, 946. The wheel axle 880 further includes a lever 950 and a bushing or flange member or component 952 coupled proximate an opposing end of the main body 940. The lever pivots relative to the bushing component 952 about a lever axis 954 and engages the bushing 952 with a cam surface 956. The cam surface 956 is offset relative to the lever axis 954. The lever 950 further includes a locking recess 958 formed therein. As shown in FIG. 26, the wheel axle 880 may also include an unlocking lever 960, coupled to the lever 950 at a pivot 962. The unlocking lever 960 includes a flange 964 engaging the bushing member 952, and facilitates movement of the lever 950 from a locked to an unlocked position, as the offset cam surface 956 creates tension across the wheel axle 880 in the locked position thereof.

With particular reference to FIGS. 27A-D, the engagement of the wheel axle 880 and the axle coupling 920 is illustrated. It should be understood that certain features of the wheel axle 880, e.g., the bushing member 952, are omitted from FIGS. 27A-D, towards illustrating the locking recess 958. Initially, the biasing member 948 displaces the bayonet component 942 into the locking recess 958 of the lever 950, to inhibit rotation of the lever 950. The wheel axle 880 is radially twisted to guide the protrusions 944, 946 of the bayonet member 942 into the recesses 922, 924 of the axle coupling 920. As the protrusions 944, 946 advance through the recesses 922, 924, the main body 940 of the wheel axle 880 engages the axle coupling, and the resilient member 948 is compressed. When the protrusions 944, 946 of the bayonet component 942 are fully positioned in the recesses 922, 924, the main body 940 is displaced relative to the bayonet component 942 such that the bayonet component 942 is disengaged from the locking recess 958. With this configuration, locking of the wheel axle 880 may not be attempted until the axle is properly engaged with the axle coupling 920. With the wheel axle 880 properly engaged with the axle coupling 920, the lever 950 may be rotated. The offset cam surface 956 engages the bushing member 952 applying tension across the wheel axle 880 to secure it in a locked position.

CONCLUSION

In general, computing systems and/or devices, such as the computer 282 and/or motor controller 284 of the bicycle 100, and the power and control system of the bicycle 600, may employ any of a number of computer operating systems, including, but by no means limited to, versions and/or varieties of the Ford SYNC® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance. Examples of computing devices include, without limitation, a vehicle computer or control unit, a smart phone, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. For example, many of the components of the bicycles according to the principles of the present disclosure may be formed from a variety of materials and/or combinations thereof, as dictated by user preference, specific applications, and the like. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. As used herein, the adverb "substantially" modifying an adjective means that a shape or structure may deviate from an exact described geometry because of imperfections in materials, machining, manufacturing, etc. It is anticipated and intended that future developments will occur in the arts discussed herein, and that the disclosed systems and methods will be incorporated into such future embodiments. In sum, it should be understood that the invention is capable of modification and variation and is limited only by the following claims.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus comprising:
   a first component having a first axial aperture therethrough and a first coupling surface, the first component having an axial recess in the first coupling surface; and
   a second component having a second axial aperture therethrough and a second coupling surface, the second component having an axial protrusion extending from the second coupling surface, the axial recess of the first component and the axial protrusion of the second component selectively engaging to radially lock the first component relative to the second component and align the first and second apertures upon engagement with each other,
   wherein the first and second apertures selectively receive a bicycle wheel axle, and
   wherein the first component is configured with a center of gravity between the first aperture and a radially peripheral opening of the axial recess.

2. The apparatus of claim 1, wherein the axial recess of the first component overlaps the first aperture, and the axial protrusion of the second component overlaps the second aperture.

3. The apparatus of claim 2, wherein the axial recess of the first component and the axial protrusion of the second component each substantially have a shape of a rounded wedge.

4. The apparatus of claim 1, wherein the first component includes apertures spaced apart from the axial recess to displace the center of gravity of the first component.

5. The apparatus of claim 1, wherein the second component has a center of gravity between the second aperture and a radially peripheral portion of the axial protrusion.

6. The apparatus of claim 1, wherein the first component selectively couples a gear assembly for a bicycle, and the second component selectively couples a wheel for a bicycle.

7. The apparatus of claim 1, wherein the first and second components have substantially round disc shapes defined about the first and second apertures, respectively.

8. An apparatus comprising:
   a first component having a first axial aperture therethrough and a first coupling surface, the first component having an axial recess in the first coupling surface; and
   a second component having a second axial aperture therethrough and a second coupling surface, the second component having an axial protrusion extending from the second coupling surface, the axial recess of the first component and the axial protrusion of the second component selectively engaging to radially lock the first component relative to the second component and align the first and second apertures upon engagement with each other,
   wherein the first and second apertures selectively receive a bicycle wheel axle,
   wherein the axial recess of the first component overlaps the first aperture, and the axial protrusion of the second component overlaps the second aperture, and
   wherein the axial recess of the first component and the axial protrusion of the second component each have a substantially rectangular portion proximate the first and second apertures, respectively, and a substantially wedge-shaped portion between the perimeters thereof and the first and second apertures, respectively.

9. An apparatus comprising:
   a frame;
   an axle rotatably coupled to the frame;
   a first component having a first axial aperture therethrough configured to receive the axle, the first component having a first coupling surface and an axial recess in the first coupling surface;
   a second component having a second axial aperture therethrough configured to receive the axle, the second component having a second coupling surface and an axial protrusion extending from the second coupling surface, the axial recess of the first component and the axial protrusion of the second component selectively engaging to radially lock the first component relative to the second component and align the first and second apertures upon engagement with each other; and
   a gear hub assembly rotatably coupled to the frame and rotatably fixed to the first component, the gear hub assembly configured to receive a gear cassette.

10. The apparatus of claim 9, wherein the axial recess of the first component overlaps the first aperture, and the axial protrusion of the second component overlaps the second aperture.

11. The apparatus of claim 10, wherein the axial recess of the first component and the axial protrusion of the second component each have a substantially rectangular portion proximate the first and second apertures, respectively, and a substantially wedge-shaped portion between the perimeters thereof and the first and second apertures, respectively.

12. The apparatus of claim 10, wherein the axial recess of the first component and the axial protrusion of the second component each substantially have a shape of a rounded wedge.

13. The apparatus of claim 9, wherein the first component has a center of gravity between the first aperture and a radially peripheral opening of the axial recess.

14. The apparatus of claim 13, wherein the first component includes apertures spaced apart from the axial recess to displace the center of gravity of the first component.

15. The apparatus of claim 9, wherein the second component has a center of gravity between the second aperture and a radially peripheral portion of the axial protrusion.

16. The apparatus of claim 9, wherein the first component selectively couples a gear assembly for a bicycle, and the second component selectively couples a wheel for a bicycle.

17. The apparatus of claim 9, wherein the first and second components have substantially round disc shapes defined about the first and second apertures, respectively.

18. The aperture of claim 9, wherein the axle includes a release handle to selectively detach the axle from the frame.

* * * * *